United States Patent
Duffy et al.

(10) Patent No.: US 12,129,024 B2
(45) Date of Patent: Oct. 29, 2024

(54) FAN APPARATUS WITH LIFT FAN AND LOUVERED COVER

(71) Applicants: Aurora Flight Sciences Corporation, a subsidiary of The Boeing Company, Manassas, VA (US); The Boeing Company, Chicago, IL (US)

(72) Inventors: Michael J. Duffy, Saint Charles, MO (US); Oliver Daniel Ensslin, Lucerne (CH); Emanuele Marano, Bern (CH)

(73) Assignees: Aurora Flight Sciences Corporation, a subsidiary of The Boeing Company, Manassas, VA (US); The Boeing Company, Arlington, VA (US)

( * ) Notice: Subject to any disclaimer, the term of this patent is extended or adjusted under 35 U.S.C. 154(b) by 40 days.

(21) Appl. No.: 17/555,299

(22) Filed: Dec. 17, 2021

(65) Prior Publication Data
US 2022/0194575 A1    Jun. 23, 2022

Related U.S. Application Data

(60) Provisional application No. 63/127,938, filed on Dec. 18, 2020.

(51) Int. Cl.
*B64C 29/00* (2006.01)
*B64C 3/38* (2006.01)
(Continued)

(52) U.S. Cl.
CPC ............ *B64C 29/0025* (2013.01); *B64C 3/38* (2013.01); *B64C 21/02* (2013.01); *F02K 1/002* (2013.01)

(58) Field of Classification Search
CPC ....... B64C 29/0025; B64C 3/38; B64C 21/02; B64C 11/001
See application file for complete search history.

(56) References Cited

U.S. PATENT DOCUMENTS 2,736,514 A    2/1956  Ross
3,116,898 A *  1/1964  Clark .................. B64C 29/0016
                                                244/23 B
(Continued)

FOREIGN PATENT DOCUMENTS

DE    102008037696 A1    2/2010
DE    102019118023 B3 *  7/2020
(Continued)

OTHER PUBLICATIONS

U.S. Patent and Trademark Office, Final Office Action regarding U.S. Appl. No. 16/878,529, dated Aug. 5, 2022, 27 pages.
(Continued)

*Primary Examiner* — Joshua J Michener
*Assistant Examiner* — Cindi M Curry
(74) *Attorney, Agent, or Firm* — Kolisch Hartwell, P.C.

(57) ABSTRACT

The present disclosure provides systems, apparatuses, and methods relating to a fan apparatus including a lift fan mounted in a duct and a cover for the lift fan. In some examples, a fan apparatus has a louvered cover including louvers having different chord lengths and/or different projection distances relative to one another when the louvers are in an intermediate (transitional) position. In some examples, a fan apparatus includes a louver actuation assembly configured to move louvers of the fan apparatus rotationally and translationally between open and closed positions. In some examples, a fan apparatus includes a fluid-actuated sealing assembly configured to form a seal between a sealing member and a cover, such as a louvered cover.

20 Claims, 16 Drawing Sheets

(51) Int. Cl.
  B64C 21/02 (2006.01)
  F02K 1/00 (2006.01)

(56) References Cited

U.S. PATENT DOCUMENTS

| | | | |
|---|---|---|---|
| 3,369,773 | A | 2/1968 | Erwin |
| 3,638,884 | A | 2/1972 | Timperman |
| 4,828,203 | A * | 5/1989 | Clifton ................ B64C 29/0033 244/12.3 |
| 6,561,456 | B1 | 5/2003 | Devine |
| 2009/0084907 | A1 | 4/2009 | Yoeli |
| 2017/0321602 | A1 | 11/2017 | Guijarro Valencia et al. |
| 2018/0186449 | A1 | 7/2018 | Jiang |
| 2019/0338728 | A1 | 11/2019 | Hussain |
| 2020/0009974 | A1 | 1/2020 | Bender et al. |
| 2020/0009989 | A1 | 1/2020 | Muller |
| 2020/0010185 | A1 | 1/2020 | Bender |
| 2020/0010186 | A1 | 1/2020 | Bender et al. |
| 2020/0010188 | A1 | 1/2020 | Fauri |
| 2020/0010209 | A1 | 1/2020 | Bender |
| 2020/0010210 | A1 | 1/2020 | Warbeck |
| 2020/0354052 | A1 | 11/2020 | Chew et al. |
| 2021/0362836 | A1 * | 11/2021 | Parks .................... B64C 11/001 |
| 2023/0174253 | A1 * | 6/2023 | Chew .................... B64C 39/024 244/17.23 |

FOREIGN PATENT DOCUMENTS

| | | | |
|---|---|---|---|
| FR | 2061703 | A1 | 6/1971 |
| FR | 2986210 | A1 * | 8/2013 ............. B64C 15/14 |
| JP | H035818 | Y2 | 2/1991 |

OTHER PUBLICATIONS

U.S. Patent and Trademark Office, Non-Final Office Action regarding U.S. Appl. No. 16/878,529, dated Dec. 9, 2022, 20 pages.
European Patent Office, Extended European Search Report regarding European Patent Application No. 21215626.9, dated Apr. 25, 2022, 12 pages.
U.S. Patent and Trademark Office, Non-Final Office Action regarding U.S. Appl. No. 16/878,529, dated Mar. 14, 2022, 17 pages.
U.S. Patent and Trademark Office, Non-Final Office Action regarding U.S. Appl. No. 16/878,529, dated Jun. 28, 2023, 21 pages.

* cited by examiner

FAN APPARATUS WITH LIFT FAN AND LOUVERED COVER

CROSS-REFERENCES

This application claims the benefit under 35 U.S.C. § 119(e) of the priority of U.S. Provisional Patent Application Ser. No. 63/127,938, filed Dec. 18, 2020, the entirety of which is hereby incorporated by reference for all purposes.

BACKGROUND

Vertical Take-Off and Landing (VTOL) aircraft offer desirable operational versatility, but require efficient and reliable transition between vertical and horizontal aerodynamic modes. A variety of designs have been used to achieve a changeover between vertical thrust and horizontal acceleration. One approach includes a lift fan mounted in a duct extending vertically through the aircraft wing. A cover of some type over the lift fan is actuated to admit or exclude air.

During transition between forward flight and hovering the cover must turn the flow of air over the wing into the duct. This sharp turn may result in flow separation and turbulence, as well as significant loading on the system used to actuate movement of the cover. Thrust may be reduced, drag increased, and vibration transmitted to the aircraft wing. Therefore, an aerodynamically and mechanically efficient cover for a wing-embedded lift fan is desirable.

SUMMARY

The present disclosure provides systems, apparatuses, and methods relating to a fan apparatus including a lift fan mounted in a duct and a cover for the lift fan. In some examples, a fan apparatus has a louvered cover including louvers having different chord lengths and/or different projection distances relative to one another when the louvers are in an intermediate (transitional) position. In some examples, a fan apparatus includes a louver actuation assembly configured to move louvers of the fan apparatus rotationally and translationally between open and closed positions. In some examples, a fan apparatus includes a fluid-actuated sealing assembly configured to form a seal between a sealing member and a cover, such as a louvered cover.

In some examples, a fan apparatus comprises a duct having an opening. The fan apparatus also comprises a lift fan mounted in the duct and a series of louvers positioned at the opening and each configured to move between an open position and a closed position. The louvers are offset from one another along a fore-to-aft axis. The series of louvers include a fore louver and an aft louver. A chord length of the aft louver is greater than a chord length of the fore louver.

In some examples, an aircraft comprises an airfoil structure including a duct having an opening. The aircraft also comprises a lift fan mounted in the duct and a series of louvers positioned at the opening and each configured to move between an open position and a closed position via an intermediate position when the aircraft transitions between a horizontal flight mode and a vertical flight mode. The louvers are offset from one another along a fore-to-aft axis of the aircraft. The series of louvers include a fore louver and an aft louver. The aft louver has a greater chord length and/or, in the intermediate position, projects farther out of the duct than the fore louver.

In some examples, a method of controlling airflow is performed with respect to an airfoil structure containing a lift fan mounted in a duct, during a transition phase between horizontal and vertical flight modes of an aircraft. In the method, a series of louvers located at an opening of the duct each is moved between an open or closed position and an intermediate position. An aft louver of the series has a greater chord length and/or, in the intermediate position, projects farther out of the duct than a fore louver of the series.

In some examples, a fan apparatus includes a duct having a duct opening. The fan apparatus also comprises a lift fan mounted in the duct and a plurality of louvers positioned at the duct opening. Each louver is configured to move between an open position and a closed position. The closed position is rotationally offset and translationally offset from the open position.

In some examples, an aircraft comprises an airfoil structure including a duct having a duct opening. The aircraft also comprises a lift fan mounted in the duct, a beam fixed to and spanning the duct, and a linkage bar substantially enclosed by the beam. A plurality of louvers are positioned at the duct opening and each is coupled to the linkage bar. An actuator is configured to drive longitudinal travel of the linkage bar in the beam, such that the plurality of louvers each move between an open position and a closed position when the aircraft transitions from a vertical flight mode to a horizontal flight mode.

In some examples, a method of controlling airflow is performed with respect to an airfoil structure containing a lift fan mounted in a duct. In the method, each louver of a plurality of louvers located at an opening of the duct is moved between an open position and a closed position. The closed position is rotationally offset and translationally offset from the open position.

In some examples, a fan apparatus comprises a duct having a duct opening, a fan mounted in the duct, and a plurality of louvers positioned at the duct opening. Each louver has an open position and a closed position. A sealing member is attached to the duct at the duct opening and forms a wall of a plenum. A pressure source is configured to pressurize the plenum such that the sealing member is urged against an edge of one or more of the louvers in the closed position.

In some examples, an aircraft comprises an airfoil structure including a duct or chamber having an opening. The aircraft also comprises a cover positioned at the opening and having an open position and a closed position, and a sealing member located at a lip of the opening and forming a wall of a plenum. A pressure source is configured to pressurize the plenum such that the sealing member is urged against an edge of the cover in the closed position.

In some examples, an aircraft comprises an airfoil structure including a duct having a duct opening. A sealing member is located at a lip of the duct opening and forms a wall of a plenum. A lift fan is mounted in the duct. A plurality of louvers are positioned at the duct opening and each is configured to move between an open position and a closed position when the aircraft transitions between a vertical flight mode and a horizontal flight mode. A sealing member is located at a lip of the duct opening and forms a wall of a plenum. A pressure source is configured to pressurize the plenum such that the sealing member is urged against an edge of one or more of the louvers in the closed position.

In some examples, a method of creating a seal in an aircraft is provided. In the method, a cover at an opening of a duct or chamber of the aircraft is closed to position an edge of the cover adjacent a sealing member forming a wall of a plenum. The plenum is pressurized to urge the sealing member against the edge of the cover.

Features, functions, and advantages may be achieved independently in various examples of the present disclosure, or may be combined in yet other examples, further details of which can be seen with reference to the following description and drawings.

DETAILED DESCRIPTION

Figure 1:
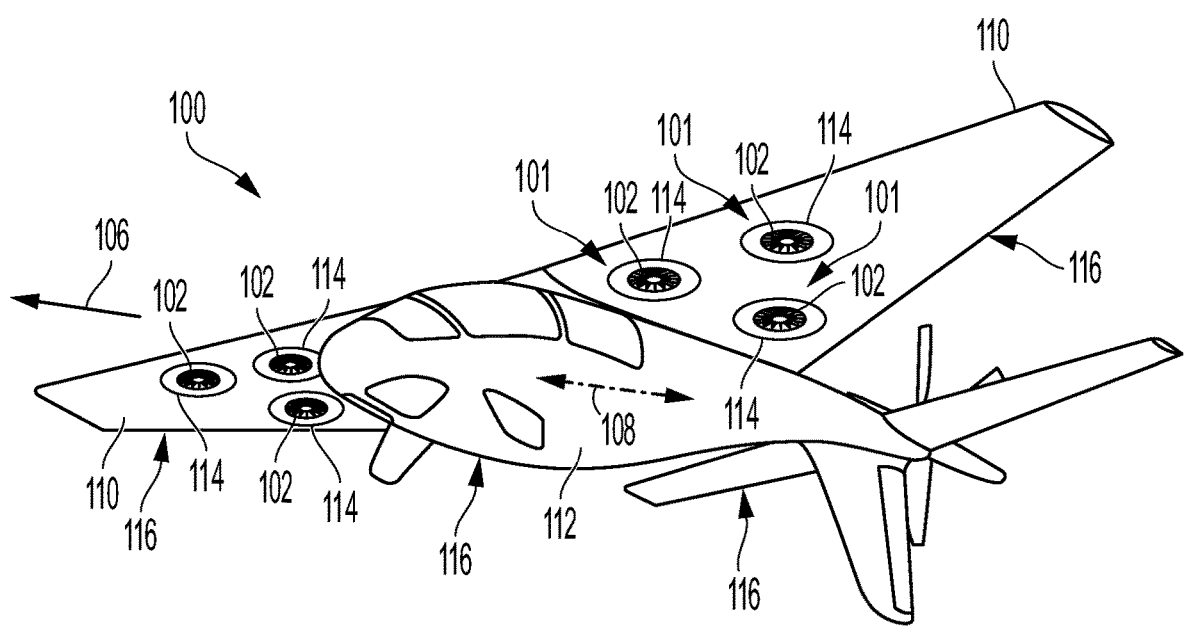
FIG. 1 is a view of an illustrative Vertical Take-Off and Landing (VTOL) aircraft including fan apparatuses with lift fans.

Various aspects and examples of a fan apparatus, an airfoil structure, an aircraft, a louvered cover for a lift fan, a louver actuation assembly, and a sealing assembly for a cover, as well as related methods, are described below and illustrated in the associated drawings. Unless otherwise specified, a fan apparatus, an airfoil structure, an aircraft, a louvered cover for a lift fan, a louver actuation assembly, and a sealing assembly for a cover, in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through F, each of which is labeled accordingly.

Overview

The present disclosure provides systems, apparatuses, and methods relating to a fan apparatus including a lift fan mounted in a duct and a cover for the lift fan. In some examples, a fan apparatus has a louvered cover including louvers having different chord lengths and/or different projection distances relative to one another when the louvers are in an intermediate (transitional) position. In some examples, a fan apparatus includes a louver actuation assembly configured to move louvers of the fan apparatus rotationally and translationally between open and closed positions. In some examples, a fan apparatus includes a fluid-actuated sealing assembly configured to form a seal between a sealing member and a cover, such as a louvered cover.

In some examples, a fan apparatus comprises a duct having an opening. The fan apparatus also comprises a lift fan mounted in the duct and a series of louvers positioned at the opening and each configured to move between an open position and a closed position. The louvers are offset from one another along a fore-to-aft axis. The series of louvers include a fore louver and an aft louver. A chord length of the aft louver is greater than a chord length of the fore louver.

In some examples, an aircraft comprises an airfoil structure including a duct having an opening. The aircraft also comprises a lift fan mounted in the duct and a series of louvers positioned at the opening and each configured to move between an open position and a closed position via an intermediate position when the aircraft transitions between a horizontal flight mode and a vertical flight mode. The louvers are offset from one another along a fore-to-aft axis of the aircraft. The series of louvers include a fore louver and an aft louver. The aft louver has a greater chord length and/or, in the intermediate position, projects farther out of the duct than the fore louver.

In some examples, a method of controlling airflow is performed with respect to an airfoil structure containing a lift fan mounted in a duct, during a transition phase between horizontal and vertical flight modes of an aircraft. In the method, a series of louvers located at an opening of the duct each is moved between an open or closed position and an intermediate position. An aft louver of the series has a greater chord length and/or, in the intermediate position, projects farther out of the duct than a fore louver of the series.

In some examples, a fan apparatus includes a duct having a duct opening. The fan apparatus also comprises a lift fan mounted in the duct and a plurality of louvers positioned at the duct opening. Each louver is configured to move between an open position and a closed position. The closed position is rotationally offset and translationally offset from the open position.

In some examples, an aircraft comprises an airfoil structure including a duct having a duct opening. The aircraft also comprises a lift fan mounted in the duct, a beam fixed to and spanning the duct, and a linkage bar substantially enclosed by the beam. A plurality of louvers are positioned at the duct opening and each is coupled to the linkage bar. An actuator is configured to drive longitudinal travel of the linkage bar in the beam, such that the plurality of louvers each move between an open position and a closed position when the aircraft transitions from a vertical flight mode to a horizontal flight mode.

In some examples, a method of controlling airflow is performed with respect to an airfoil structure containing a lift fan mounted in a duct. In the method, each louver of a plurality of louvers located at an opening of the duct is moved between an open position and a closed position. The closed position is rotationally offset and translationally offset from the open position.

In some examples, a fan apparatus comprises a duct having a duct opening, a fan mounted in the duct, and a plurality of louvers positioned at the duct opening. Each louver has an open position and a closed position. A sealing member is attached to the duct at the duct opening and forms a wall of a plenum. A pressure source is configured to pressurize the plenum such that the sealing member is urged against an edge of one or more of the louvers in the closed position.

In some examples, an aircraft comprises an airfoil structure including a duct or chamber having an opening. The aircraft also comprises a cover positioned at the opening and having an open position and a closed position, and a sealing member located at a lip of the opening and forming a wall of a plenum. A pressure source is configured to pressurize the plenum such that the sealing member is urged against an edge of the cover in the closed position.

In some examples, an aircraft comprises an airfoil structure including a duct having a duct opening. A sealing member is located at a lip of the duct opening and forms a wall of a plenum. A lift fan is mounted in the duct. A plurality of louvers are positioned at the duct opening and each is configured to move between an open position and a closed position when the aircraft transitions between a vertical flight mode and a horizontal flight mode. A sealing member is located at a lip of the duct opening and forms a wall of a plenum. A pressure source is configured to pressurize the plenum such that the sealing member is urged against an edge of one or more of the louvers in the closed position.

In some examples, a method of creating a seal in an aircraft is provided. In the method, a cover at an opening of a duct or chamber of the aircraft is closed to position an edge of the cover adjacent a sealing member forming a wall of a plenum. The plenum is pressurized to urge the sealing member against the edge of the cover.

Examples, Components, and Alternatives

The following subsections describe selected aspects of illustrative VTOL aircraft, lift fan apparatuses for VTOL aircraft, louvered covers for lift fan apparatuses, louver actuation assemblies for louvered covers, and fluid-actuated sealing assemblies for covers, such as louvered covers, as well as related systems and/or methods. The examples in these subsections are intended for illustration and should not be interpreted as limiting the entire scope of the present disclosure. Each section may include one or more distinct examples, and/or contextual or related information, function, and/or structure.

A. Illustrative VTOL Aircraft with Fan Apparatuses

This subsection describes an illustrative aircraft 100 including fan apparatuses 101. Each fan apparatus includes a lift fan 102 and louvered covers 104; see FIGS. 1-6. Aircraft 100 may have any suitable combination of components and features, and may be used in any processes, described for the aircraft of subsections B-F.

FIG. 1 shows aircraft 100 in horizontal wing-supported flight, with forward flight 106 corresponding to a fore-to-aft axis 108 (or longitudinal axis) defined by the aircraft. The aircraft includes two fixed wings 110 extending from a fuselage 112. Each wing 110 contains three fan apparatuses 101, each including a lift fan 102 mounted in a duct 114 extending vertically through the wing. In general, aircraft 100 may include any effective number of lift fans, mounted in any effective position in an airfoil structure 116 of the aircraft, such as wings 110, fuselage 112, a tail, or the like. The number and positions of the lift fans may vary depending on aircraft configuration and phases of flights the aircraft is required to perform, for example take-off, climb, hover, outboard transition, cruise, forward-flight, descent, inboard transition, and landing.

Figure 2:
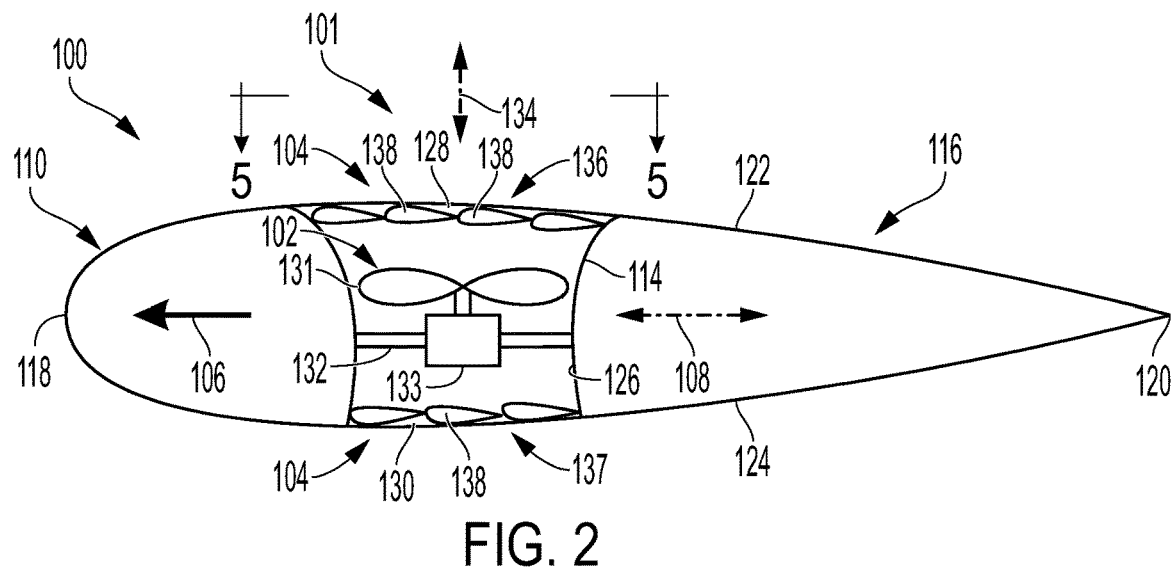
FIG. 2 is a schematic cross-sectional view of one of the wings of the aircraft of FIG. 1 during forward flight (a horizontal flight mode) of the aircraft, taken through one of the fan apparatuses in which a lift fan is mounted in a duct, with upper louvers and lower louvers in closed positions at inlet and outlet openings of the duct.

FIG. 2 shows one of wings 110 in schematic cross-section through one of the fan apparatuses 101 during horizontal flight 106 of aircraft 100. Wing 110 is an airfoil structure 116 having a leading edge 118 opposite a trailing edge 120, with the leading and trailing edges separated along fore-to-aft axis 108 from one another. Leading edge 118 is more rounded than trailing edge 120, and trailing edge 120 is more tapered than leading edge 118. The wing has an upper surface 122 and a lower surface 124. The upper and lower surfaces may be symmetrical to one another, as shown, or these surfaces may have different contours to give the wing camber.

Duct 114 extends vertically through wing 110 from upper surface 122 to lower surface 124. The duct forms an approximately circular aperture through the wing, defined by a duct wall 126 of the duct. Duct 114 has an inlet opening 128 at upper surface 122 of the wing, and an outlet opening 130 at lower surface 124 of the wing. The wing or duct may be described as having a fore-to-aft axis or longitudinal axis, which is parallel to fore-to-aft axis 108 of aircraft 100. When the aircraft is in horizontal flight, the fore-to-aft or longitudinal axis of the aircraft and/or wing may coincide with a relative wind direction, where relative wind is defined as the direction of movement of the surrounding atmosphere relative to the aircraft.

A lift fan 102 is mounted in duct 114. The lift fan includes a fan blade assembly 131 (also called a fan rotor) and a stator 132. The stator is rigidly fixed to duct 114. The fan blade assembly is mounted above, and supported on stator 132, and driven by a fan motor 133 about a rotational axis 134, which is aligned with a central axis of duct 114. Lift fan 102 and duct 114 may be referred to as contained in wing 110.

A pair of louvered covers 104 are movably coupled to duct 114. An upper cover 136 is located at inlet opening 128, and a lower cover 137 is located at outlet opening 130. Lift fan 102 is situated between upper cover 136 and lower cover 137. Each louvered cover 104 includes a plurality of louvers 138 arranged as a series along the fore-to-aft axis of duct 114. Each louver 138 has an airfoil shape configured to direct airflow into or out of duct 114.

Figure 3:
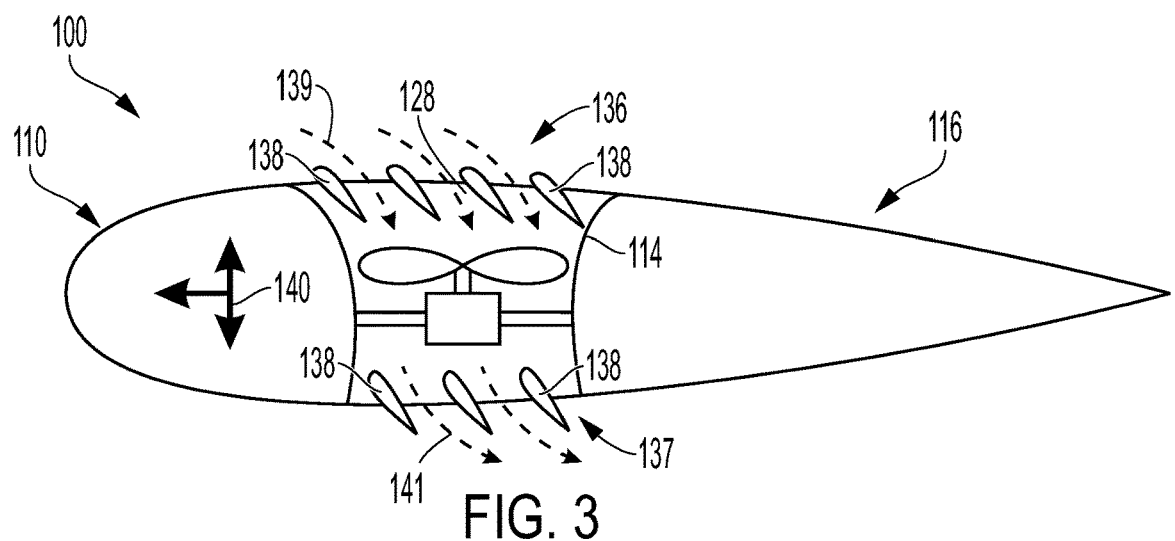
FIG. 3 is another schematic cross-sectional view of the wing of the VTOL aircraft of FIG. 1, taken as in FIG. 2, except during transition of the aircraft from forward flight to hovering (a vertical flight mode), or vice versa, with the upper louvers and the lower louvers in intermediate positions (i.e., less open than in FIG. 2).
Figure 4:
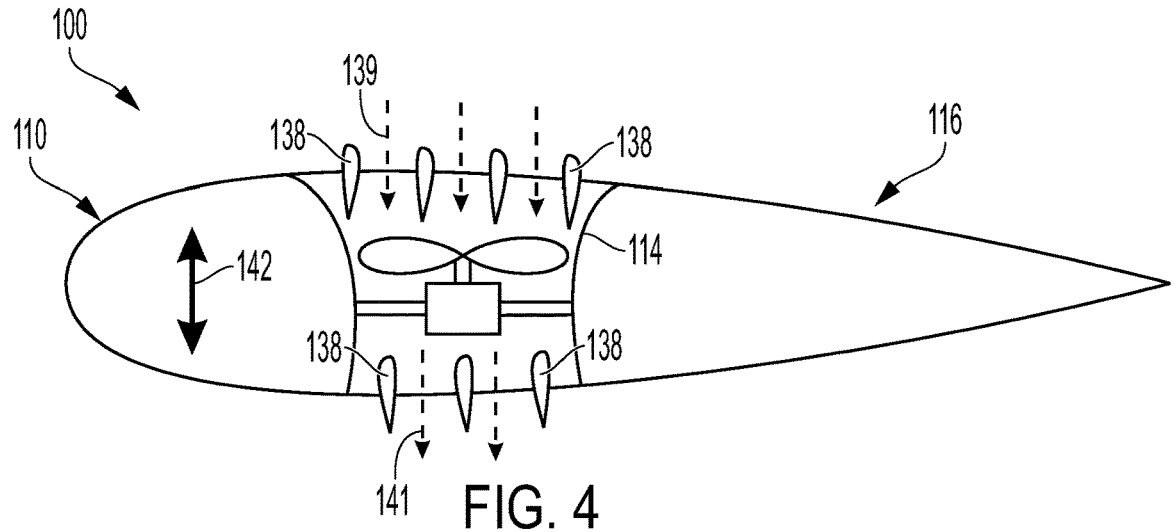
FIG. 4 is still another schematic cross-sectional view of the wing of the VTOL aircraft of FIG. 1, taken as in FIGS. 2 and 3, except while the aircraft is hovering and with the upper louvers and the lower louvers in open positions.

FIGS. 2-4 show louvered covers 104 of lift fan 102 in three different positions, namely, a closed position, an intermediate position (interchangeably called a transitional position), and an open position. The closed position of FIG. 2 substantially excludes airflow into and/or through duct 114 during horizontal flight. The intermediate position of FIG. 3, also called a partially open and/or partially closed position, deflects inlet airflow 139 into duct 114 at inlet opening 128. The intermediate position is used when aircraft 100 is transitioning from horizontal to vertical flight, or vice versa, indicated by transition arrows 140. Louvers 138 of upper cover 136 are angled forward. Louvers 138 of lower cover 137 are angled rearward, as shown, or may be angled forward or fully open, among others. In any event, louvers 138 of lower cover 137 guide outlet airflow 141 out of duct 114. The open position of FIG. 4 is used during vertical flight 142 (e.g., take off, vertical ascent, hovering, vertical descent, and landing). Airflow 139, 141 is more vertical than during the transition phase. The closed, intermediate, or open position of a louvered cover is produced collectively by the closed, intermediate, or open positions of the individual louvers 138 of the cover, and vice versa. For example, in a closed position of a louvered cover, each louver is arranged in a closed position.

Figure 5:
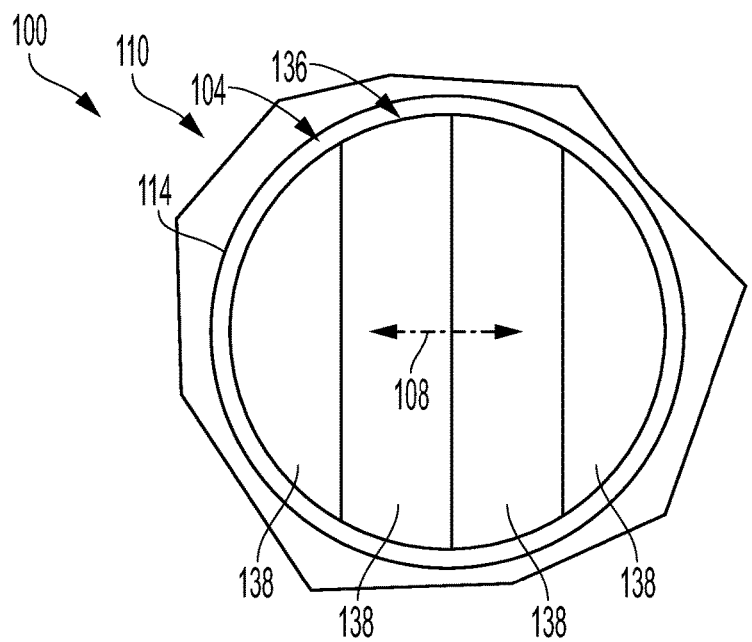
FIG. 5 is a fragmentary top view of the wing of FIG. 2 taken generally along line 5-5 of FIG. 2 around the fan apparatus.

FIG. 5 shows upper cover 136 in a closed position. Each louver 138 of the cover has a lateral extent or span, between opposite ends of the louver, which is generally perpendicular to fore-to-aft axis 108 of the aircraft. Each louver is shaped to conform to the shape of duct 114, for example a circular shape. Accordingly, the louvers of the cover may have different lengths and each may be rounded at its opposite ends and/or along a leading/trailing edge, to match the adjacent horizontal curvature of the duct wall.

The louvers of the cover are configured for installation at different fore-to-aft positions of the duct. For example, in FIG. 5, first, second, third, and fourth louvers 138 are arranged in order from fore to aft. The first and fourth louvers have shorter lateral extents than the second and third louvers. The first and fourth louvers are symmetrical to one another in plan, with the first louver have an arcuate leading edge and a linear trailing edge, and the fourth louver having an arcuate trailing edge and a linear leading edge. The second and third louvers are symmetrical to one another in plan, with each having leading and trailing edges that are linear and arcuate ends opposite one another.

Figure 6:
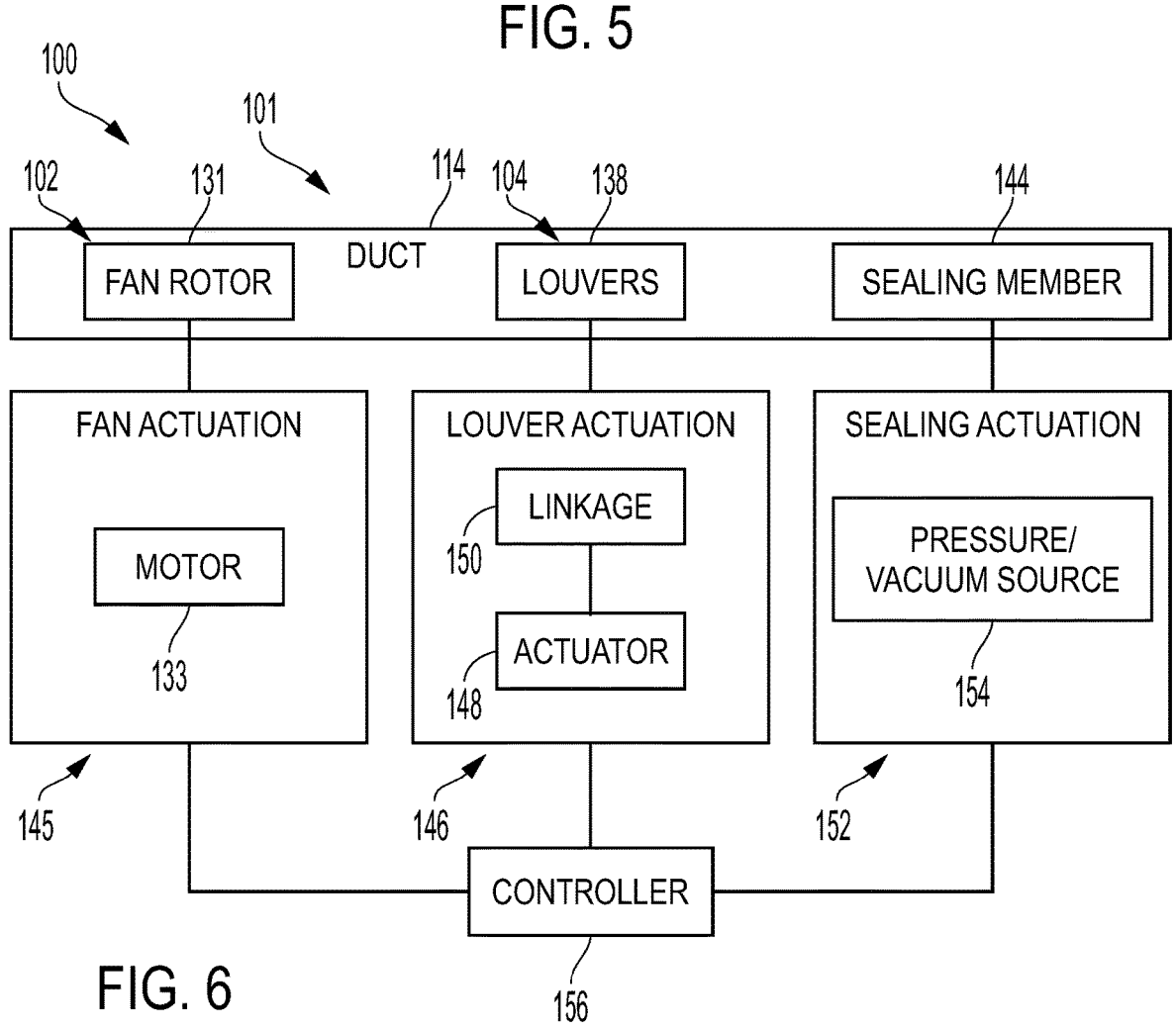
FIG. 6 is a schematic diagram of one of the fan apparatuses of FIG. 1 and showing actuation assemblies that may be operatively associated with the duct, lift fan, and/or upper/lower louvers of the fan apparatus.

FIG. 6 shows a schematic diagram of actuation assemblies of the aircraft of FIG. 1 for one of fan apparatuses 101. Each actuation assembly may be operatively associated with a lift fan 102 mounted in a duct 114, a louvered cover 104 at an opening of the duct, and/or a sealing member 144 at the duct wall of duct 114. A fan actuation assembly 145 is operatively coupled to fan blade assembly 131 ("fan rotor") and includes fan motor 133 and a linkage, such as a driveshaft, that is firmly attached to the fan blade assembly and rotated by operation of the fan motor. A louver actuation assembly 146 is operatively coupled to louvered cover 104 and drives movement of louvers 138 of the cover between open, intermediate (transitional), and closed positions. The louver actuation assembly includes an actuator 148 (such as a motor) and a linkage assembly 150 that transmits motive force from the actuator to each louver 138 of the cover. A sealing actuation assembly 152 is operatively coupled to sealing member 144. The sealing actuation assembly includes a pressure/vacuum source 154 to push sealing member 144 inward toward a central axis defined by duct 114 or pull sealing member 144 outward away from the central axis. The pressure/vacuum source may include only a pressure source, only a vacuum source, or both types of sources.

A controller 156 is configured to control and coordinate operation of the actuation assemblies. The controller controls operation of fan motor 133, such as its activation state and speed. The controller also controls operation of louver actuator 148, to move louvers 138 between open, intermediate, and closed positions. The controller further controls operation of pressure/vacuum source 154, to seal the louvered cover when in a closed position.

Further aspects of illustrative actuation assemblies are described elsewhere in the present disclosure. For example, subsection C describes an illustrative louver actuation assembly, and subsection D describes an illustrative fluid-actuated sealing assembly for use with a cover of an aircraft.

B. Illustrative Louvered Covers for Boundary Layer Reduction During Transition

This subsection describes VTOL aircraft 200, 300, and 400 having illustrative fan apparatuses 201, 301, and 401, each including a louvered cover configured to further reduce the height of the boundary layer over a ducted lift fan relative to aircraft 100 of subsection A, when transitioning between vertical and horizontal flight modes (i.e., vertical to horizontal or horizontal to vertical); see FIGS. 7-12. This further reduction of the boundary layer provides aerodynamic and mechanical advantages during transition, such as less drag, reduced turbulence and vibration, improved flight control, a lower load on louvers of the louvered covers (and on a corresponding louver actuation assembly), and/or the like.

Figure 7:
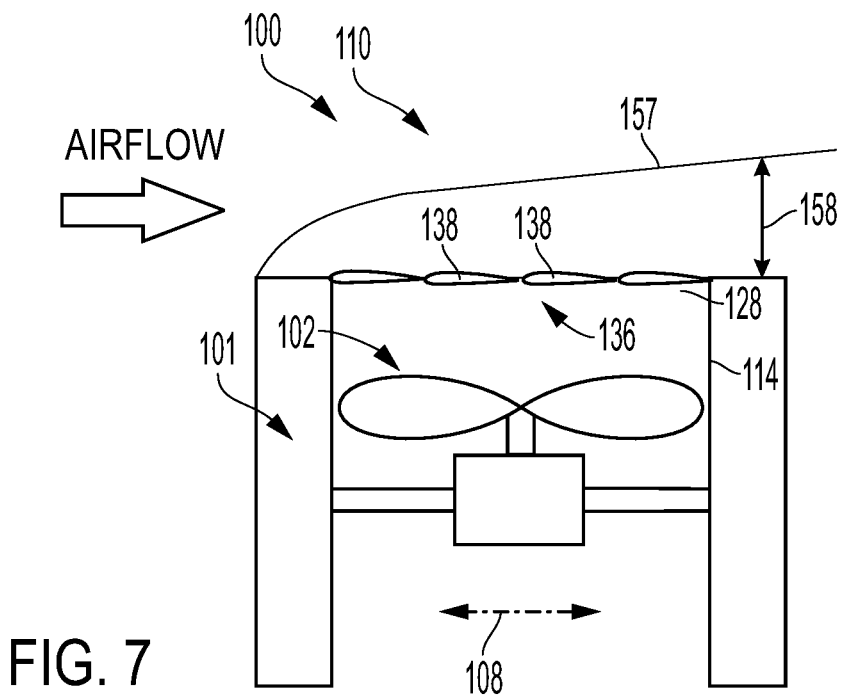
FIG. 7 is a more schematic, fragmentary cross-sectional view of an upper portion of the wing of FIG. 2, taken around the fan apparatus and illustrating the position of a boundary layer for airflow over the fan apparatus with each of the upper louvers in the closed position.

FIG. 7 shows a more schematic representation of an upper portion of wing 110 of aircraft 100 taken around fan apparatus 101 (compare with FIG. 2). The fan apparatus includes lift fan 102, duct 114, and louvers 138 of upper cover 136. A boundary layer 157 of slower moving air is produced by airflow over louvers 138 at inlet opening 128 of duct 114, with upper cover 136 in a closed position. A closed-position height 158 of the boundary layer near a trailing edge of duct 114 is indicated.

Figure 8:
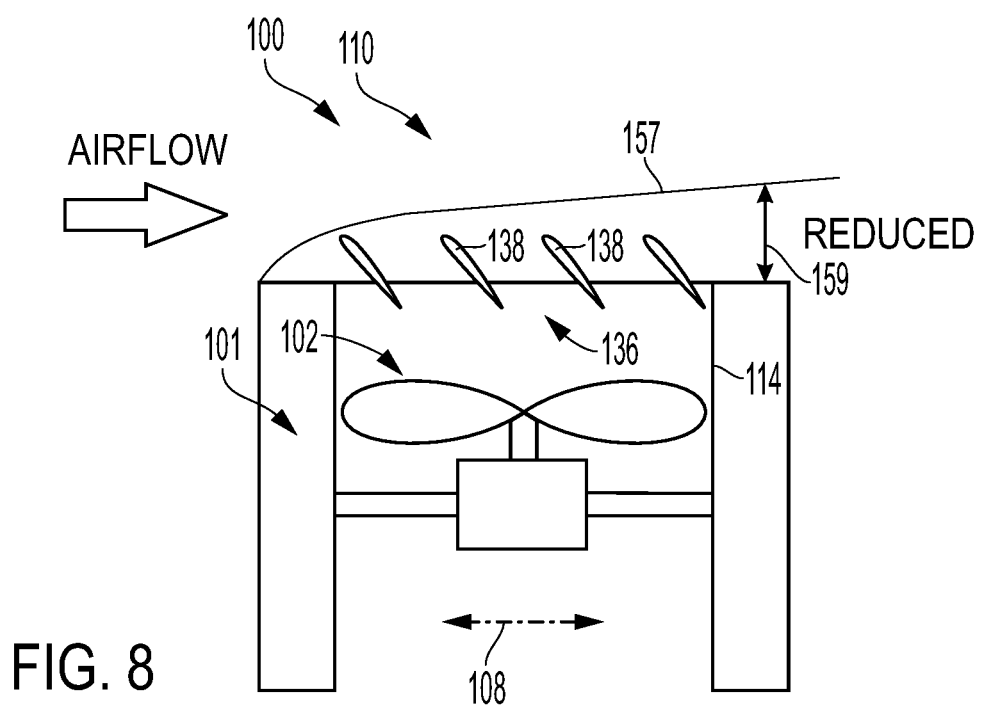
FIG. 8 is another more schematic, fragmentary cross-sectional view of the upper portion of the wing of FIG. 2, taken as in FIG. 7 except with each of the upper louvers in an intermediate position as in FIG. 3, and illustrating the boundary layer having a reduced height over the fan apparatus.

FIG. 8 shows fan apparatus 101 as in FIG. 7, except with louvers 138 of upper cover 136 in an intermediate position as in FIG. 3, during transition between horizontal and vertical flight. Boundary layer 157 now has a reduced height 159. However, further reduction of the boundary layer height for the intermediate position of the louvers would be aerodynamically and mechanically advantageous.

FIGS. 9-12 illustrate three cover configurations for further reduction of the boundary layer height during transition between flight modes. The features of these three cover configurations may be used alone or in any suitable combination in an upper cover and/or a lower cover for a lift fan.

Figure 9:
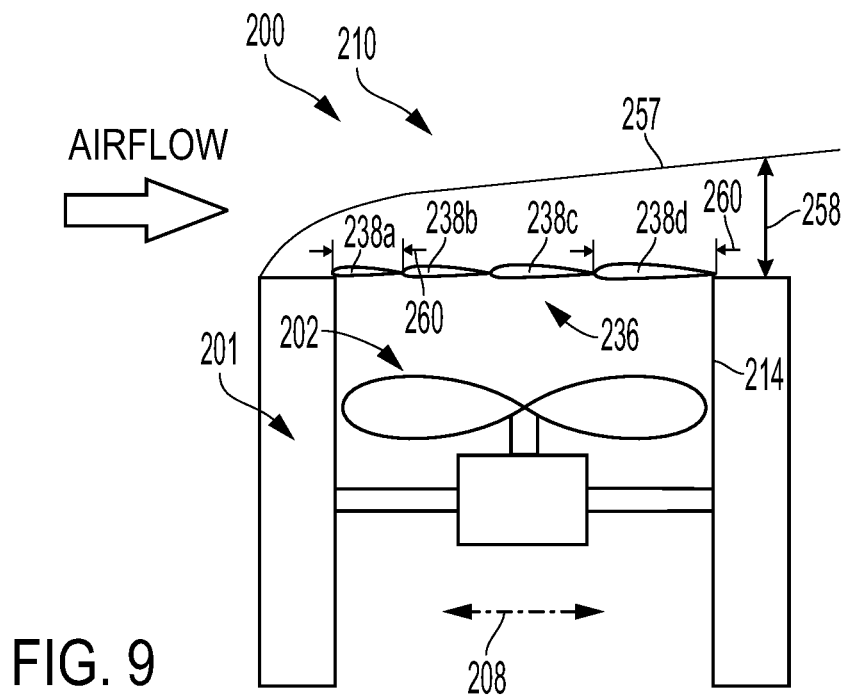
FIGS. 9 and 10 are schematic, fragmentary cross-sectional views of an upper portion of a wing containing another illustrative fan apparatus of a VTOL aircraft, taken as in FIGS. 7 and 8, respectively, except that the upper louvers have varying chord lengths, which further reduces the height of the boundary layer over the fan apparatus in the intermediate positions of the upper louvers relative to FIG. 8.
Figure 10:
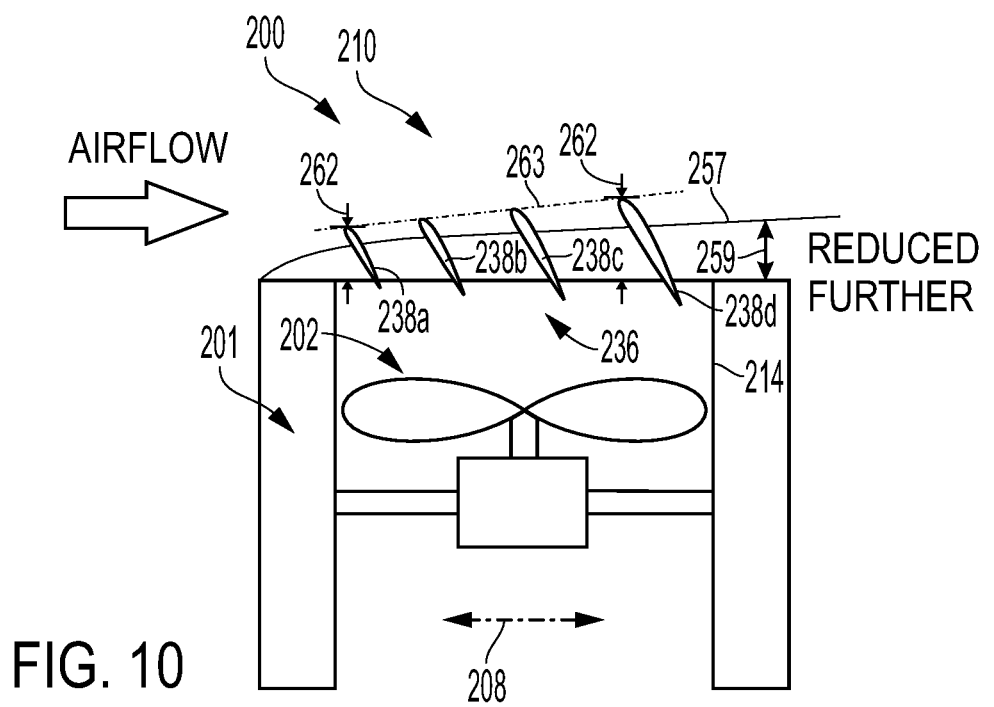

FIGS. 9 and 10 show a fan apparatus 201 including a lift fan 202, a duct 214, and a fore-to-aft series of louvers 238a-238d of an upper cover 236 from a wing 210 of a VTOL aircraft 200. Upper cover 236 is in a closed position in FIG. 9 and an intermediate position in FIG. 10 (compare with FIGS. 7 and 8). In contrast to louvers 138, louvers 238a-238d have varying chord lengths 260 relative to one another, which further reduces a closed-position height 258 of a boundary layer 257 over duct 214 (FIG. 9) to a further reduced height 259 (FIG. 10).

Chord length 260 for each louver 238a-238d is defined as the maximum chord length for the louver, measured between a leading edge and a trailing edge of the louver. The chord length increases successively and progressively from fore to aft along the series of louvers 238a-238d (and along fore-to-aft axis 208). More specifically, chord length 260 of louver 238a is less than louver 238b, which is less than louver 238c, which is less than louver 238d. Due at least in part to this difference in chord length, louvers that are located more aft along fore-to-aft series of louvers 238a-238d project farther out of duct 214 than louvers located closer to the fore (upstream) edge of upper cover 236. A projection distance 262 (interchangeably called an extension length) of fore-most louver 238a out of duct 214 is compared with that of aft-most louver 238d in FIG. 10. The greater projection distance 262 of aft-most louver 238d during transition allows it to reach farther out of the duct, to channel less-affected air into duct 214 from farther above the duct, thereby further reducing the boundary layer height. The projection distance is measured orthogonally from an upper edge or boundary of the duct, as shown in FIG. 10.

The chord lengths and projection distances of the louvers may have any suitable relationships to further reduce the height of the boundary layer during transition between flight modes. One or more aft louvers of a louvered cover may have a greater chord length and/or projection distance than one or more fore louvers of the cover. The terms "fore louver" and "aft louver" are defined relative to one another, where a fore louver(s) of a cover is located upstream of each aft louver of the cover. For example, in FIGS. 9 and 10, louver 238b is a fore louver relative to louvers 238c and 238d, which are aft louvers relative to louver 238b, and louver 238b is an aft louver relative to louver 238a. The chord length and/or projection distance in the intermediate positions of the louvers may vary among the louvers of the cover by any amount effective to further reduce the boundary layer of a duct, such as an increase of at least 5, 10, 20, 30, 40, 50, 75, or 100 percent, among others, between a fore louver and an aft louver of the cover. The chord lengths and/or projection distances may or may not increase successively along the fore-to-aft series of louvers of the cover. The increase may be a linear increase 263, as shown in FIG. 10, or a nonlinear increase. If nonlinear, the increase may be logarithmic or exponential. A linear increase may be desirable to balance the contribution of louvers for further reduction in boundary layer height among the louvers. A logarithmic increase may be desirable to weight the further reduction toward an upstream portion of the cover. An exponential increase may be desirable to weight the further reduction toward a downstream portion of the cover.

Figure 11:
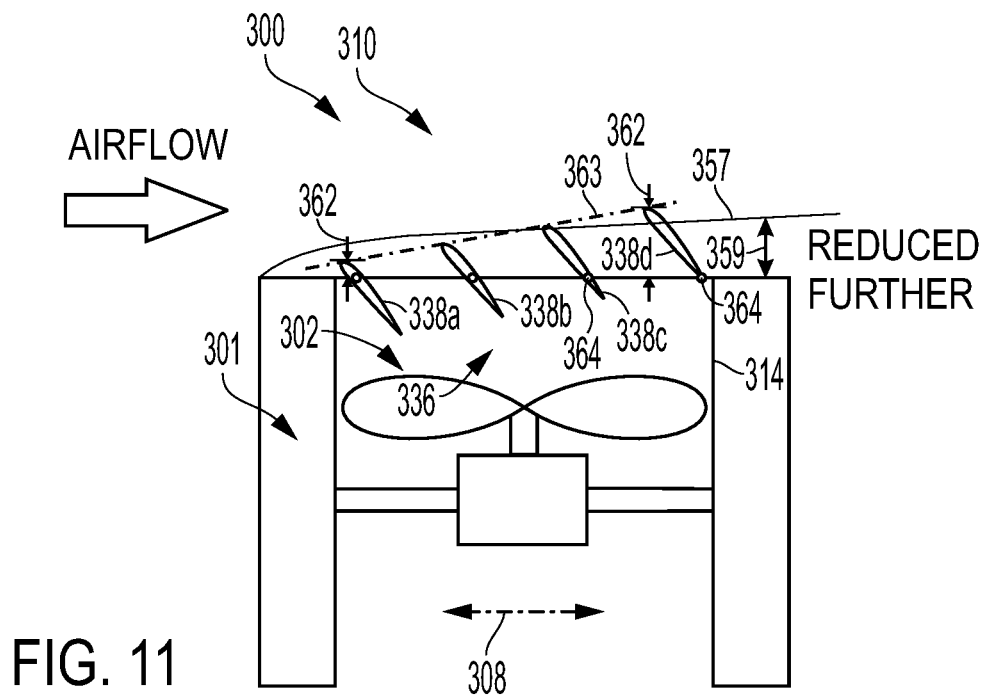
FIG. 11 is a schematic, fragmentary cross-sectional view of an upper portion of a wing containing yet another illustrative fan apparatus of a VTOL aircraft, taken as in FIG. 8, except that the upper louvers have pivot axes positioned to cause the upper louvers to project different distances out of the top of the duct when placed in intermediate positions, which further reduces the height of the boundary layer over the fan apparatus relative to FIG. 8.

FIG. 11 shows show a fan apparatus 301 including a lift fan 302, a duct 314, and a fore-to-aft series (along axis 308) of louvers 338a-338d of an upper cover 336 from a wing 310 of a VTOL aircraft 300. Louvers 338a-338d are in intermediate positions during transition between flight modes. A boundary layer 357 having a further reduced height 359 is present over duct 314. Louvers 338a-338d have respective projection distances 362 exhibiting a linear increase 363 from fore to aft. However, in contrast to louvers 238a-238d of FIGS. 9 and 10, louvers 338a-338d each have the same chord length. Instead, the fore-to-aft increase in projection distances 362 is created by varying the position of a pivot axis 364 of the louvers, namely, situating each successive pivot axis progressively farther from the leading edge of the louver along the series of louvers.

Figure 12:
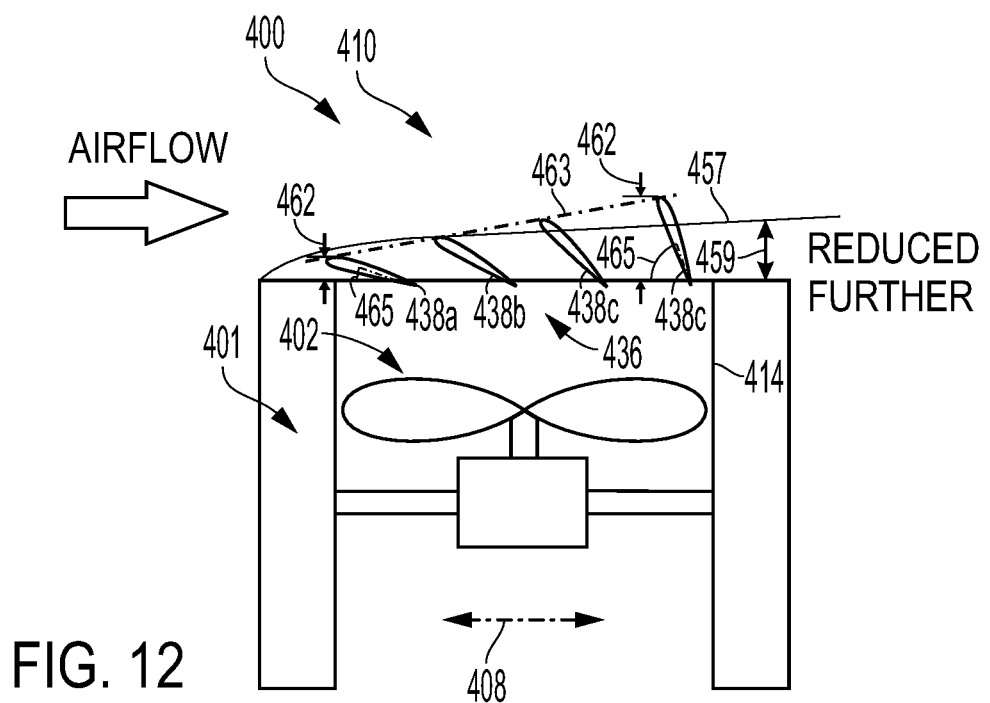
FIG. 12 is a schematic, fragmentary cross-sectional view of an upper portion of a wing containing still another illustrative fan apparatus of a VTOL aircraft, taken as in FIG. 8, except that the upper louvers rotate at different rates, such that the upper louvers project different distances out of the top of the duct when placed in intermediate positions, which further reduces the height of the boundary layer over the fan apparatus relative to FIG. 8.

FIG. 12 shows show a fan apparatus 401 including a lift fan 402, a duct 414, and a fore-to-aft series (along axis 408) of louvers 438a-438d of an upper cover 436 from a wing 410 of a VTOL aircraft 400. Louvers 438a-438d are in intermediate positions during transition between flight modes. A boundary layer 457 having a further reduced height 459 is present over duct 414. Louvers 438a-438d have respective projection distances 462 exhibiting a linear increase 463 from fore to aft. However, as in FIG. 11 and in contrast to louvers 238a-238d of FIGS. 9 and 10, louvers 438a-438d each have the same chord length. Instead, the fore-to-aft increase in projection distances 462 is created by varying an angle 465 each louver 438a-438d forms with the top of duct 414. Different angles 465 may be achieved by rotating louvers 438a-438d through different angular ranges and/or at different angular rotation rates between an open or closed position and the intermediate position. An illustrative louver actuation assembly for achieving different angular ranges and different angular rotation rates for a series of louvers is described below in subsection C.

C. Illustrative Actuation Assembly for Rotation and Translation of Louvers

A previously-proposed louver actuation mechanism has louvers of a louvered cover articulated on fixed hinges. A common pushrod is pivotably coupled to an arm of each of the louvers at a position spaced from the hinge axis of the corresponding fixed hinge. The pushrod is driven longitudinally to rotate each of the louvers via the fixed hinges, without any translational offset of the louvers. However, this actuation mechanism has some drawbacks. For example, because there is no translation of the louvers, the louvers are not positioned optimally throughout their rotational ranges. This is especially true for the forward-most louver and the aft-most louver of the cover. The forward-most louver remains too far from the forward edge (the forward inlet lip) of the duct at transition, where flow tends to separate when the aircraft is hovering with some forward speed. Also, the aft-most louver may remain too close to the aft edge (the aft inlet lip) of the duct, where the aft-most louver may act as a barrier for airflow into an aftwardly-adjacent louvered cover when the aircraft is hovering.

This subsection describes a VTOL aircraft 500 having an illustrative louver actuation assembly 546 for a fan apparatus 501 contained in an airfoil structure 516; see FIGS. 13-20. The louver actuation assembly utilizes louvers on movable hinges instead of fixed hinges, such that the actuation assembly both rotates and translates louvers 538a-538f of a louvered cover 504 for a lift fan 502 of the fan apparatus.

Louver actuation assembly 546 offers various advantages, as described further below, including any combination of the following. The louver actuation assembly has a greater mechanical advantage because effective angles of the lever arms for the louvers never get too shallow. The louver actuation assembly provides more optimal translational and rotational positioning of individual louvers for open and intermediate positions of a louvered cover. Less flow separation occurs between the leading edge of the duct and the forward-most louver. Less interference is produced between louvers of adjacent louvered covers in the open position. Actuation components are protected inside a fixed beam of the fan apparatus. A common linkage bar of the louver actuation assembly slides in the beam along a travel path predefined by one or more guide channels, which reduces play and produces a stiffer actuation.

Figure 13:
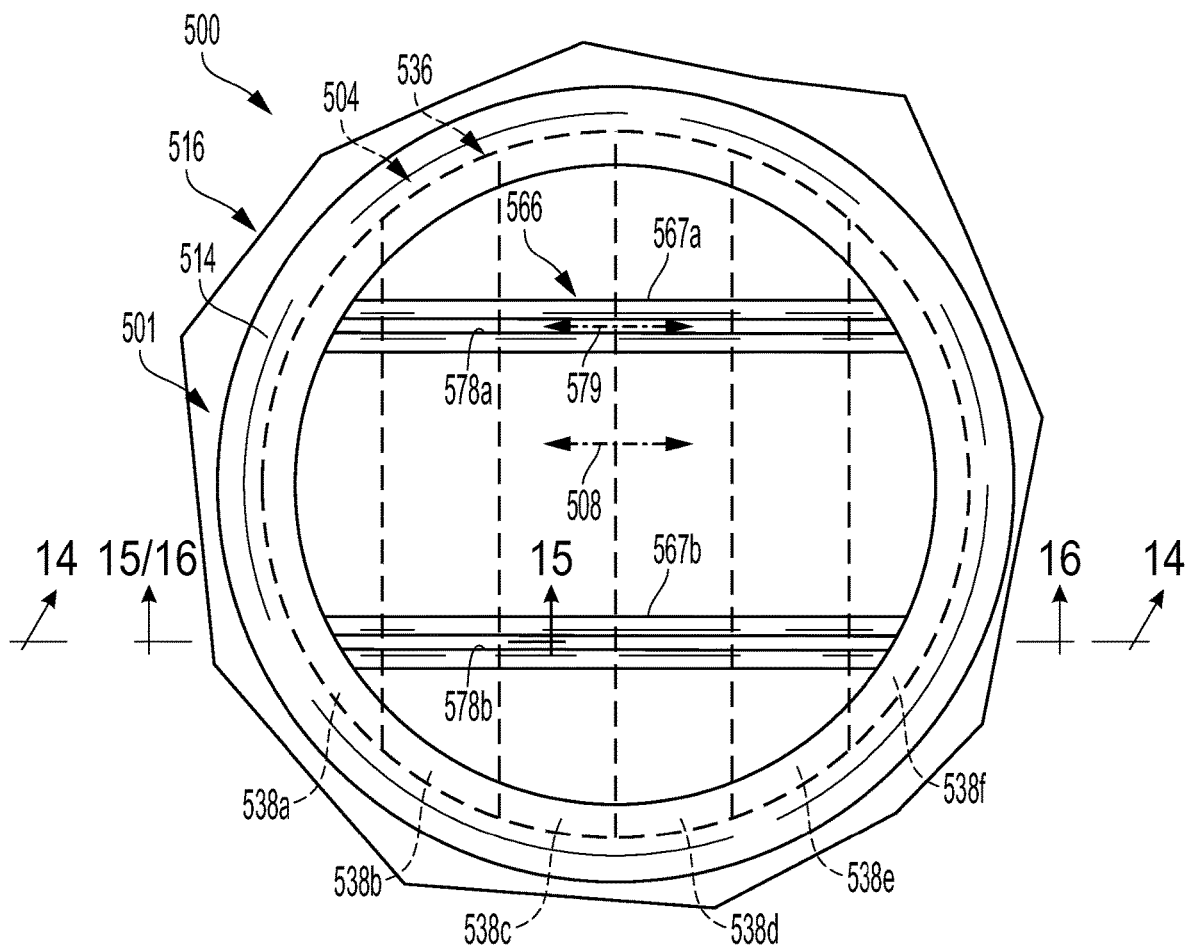
FIG. 13 is a fragmentary top view of an airfoil structure of a VTOL aircraft taken around a fan apparatus of the airfoil structure, with a louvered cover of the fan apparatus in a closed position and having louvers (in dashed outline) that rotate and translate when actuated by a louver actuation assembly.

FIG. 13 shows a fragmentary portion of an airfoil structure 516 (such as a wing) of aircraft 500 taken around fan apparatus 501 and viewed from above louvered cover 504, which is an upper cover 536. In other examples, the louvered cover described in this subsection may be situated as a lower cover for a fan apparatus, at an outlet opening of a duct. Cover 504 includes a frame 566 and six louvers 538a-538f movably coupled to the frame, although any suitable number of louvers may be used in the cover. (The cover/louvers are shown dashed in FIG. 13.) Aircraft has a fore-to-aft axis 508 and louvers 538a-538f are arranged as a series along the axis, with each louver being elongated orthogonal to axis 508. Six louvers are shown here for illustration, but any suitable number of louvers may be utilized for the louvered covers, such as 2, 3, 4, or more louvers.

Frame 566 has a pair of beams 567a, 567b spanning duct 514 under louvers 538a-538f. Each beam 567a, 567b is firmly attached to (i.e., fixed to) duct 514 at opposite ends of the beam and remains fixed with respect to duct 514 while louvers 538a-538f are actuated. Each beam 567a, 567b spans duct 514 parallel to fore-to-aft axis 508 and has an airfoil shape (e.g., generally as shown for wing 110 in FIG. 2, except with leading edge 118 located at the top of the beam). The beam houses and substantially encloses a portion of actuation assembly 546, as described further below. In other examples, the frame may have only one beam or three or more beams. Each beam interchangeably is called a spine or a strut.

Figure 14:
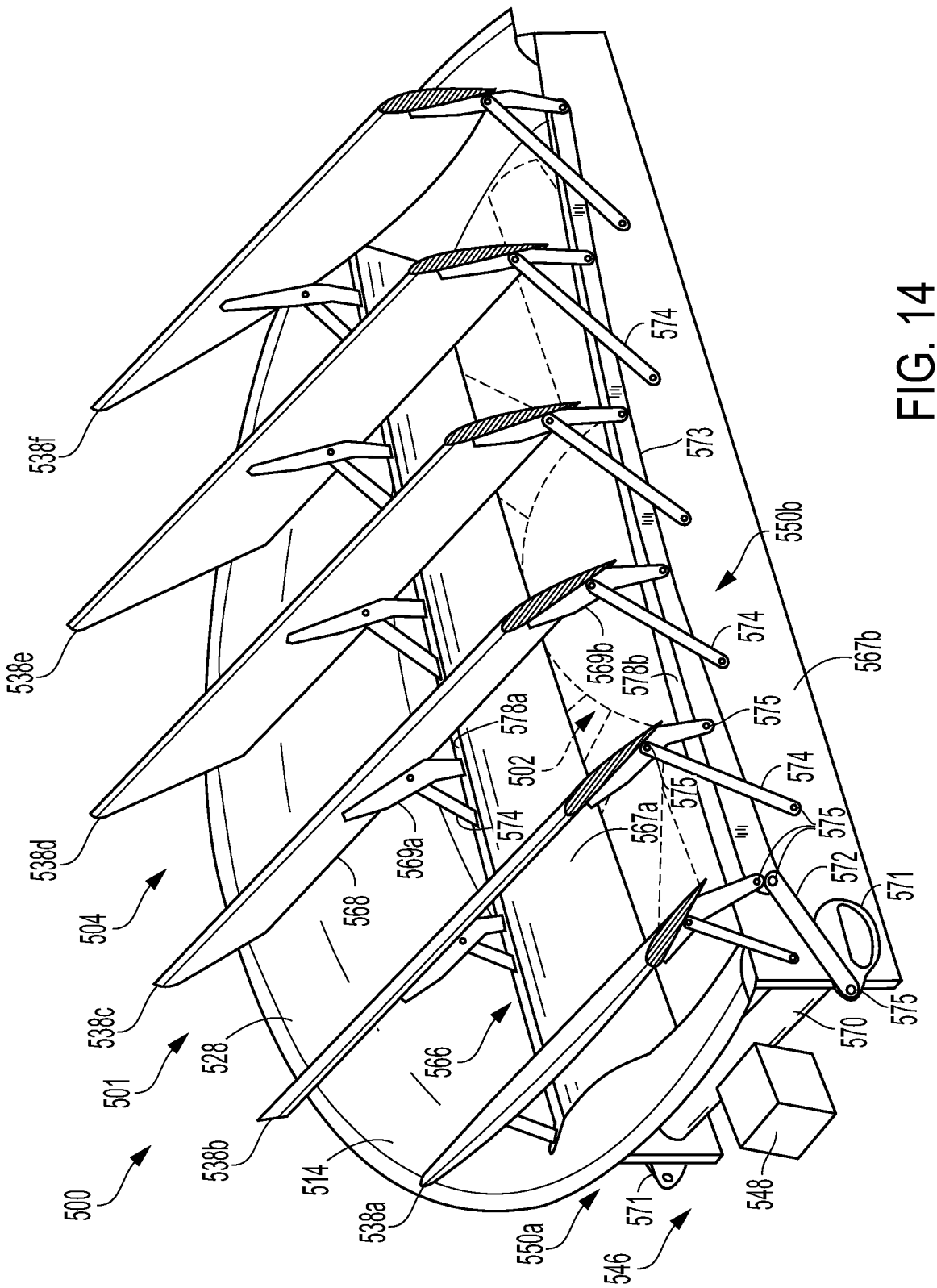
FIG. 14 is a sectional fragmentary isometric view of the fan apparatus of FIG. 13, with each of the louvers of the cover in an almost fully open position, taken through a beam fixed to and spanning the duct, as indicated by line 14-14 in FIG. 13, such that aspects of the louver actuation assembly located inside the beam are visible.

FIG. 14 shows only an upper portion of fan apparatus 501, with lift fan 502 mounted in duct 514 and depicted in dashed lines. Louvered cover 504 is located at an inlet opening 528 of the duct. Louvers 538a-538f are arranged in open positions. Duct 514, louvered cover 504, and frame 566 have been sectioned as indicated in FIG. 13 through beam 567b.

Each of louvers 538a-538f includes a vane 568 (interchangeably called a flap) and a pair of carriers 569a, 569b firmly attached to the vane (see louver 538c in FIG. 14). The vane spans duct 514 in the closed position of the louver, has an airfoil shape, and forms the body of the louver. Each vane 568 may remain completely outside beams 567a, 567b. Carriers 569a, 569b connect vane 568 to louver actuation assembly 546 and extend into respective beams 567a, 567b. In other examples, more for fewer carriers may be present in each louver, in correspondence with the number of fixed beams located adjacent the louvered cover in the duct.

Louver actuation assembly 546 includes an actuator 548 and a pair of matching linkage assemblies 550a, 550b substantially housed in respective beams 567a, 567b of frame 566. The linkage assemblies are coupled to one another and to actuator 548 via a rotatable coupling 570. The rotatable coupling is drivable in opposite rotational directions by actuator 548. A gearbox may mechanically connect actuator 548 and rotatable coupling 570 to one another.

Each linkage assembly 550a, 550b includes a crank 571, a crank link 572, a linkage bar 573 (interchangeably called a pushrod), and six louver links 574 (one for each louver); see FIGS. 14-18. Pivot joints 575 pivotably couple crank 571 to a first end of crank link 572, a second end of crank link 572 to linkage bar 573, linkage bar 573 to a carrier 569a or 569*b* of each louver, a first end of each louver link 574 to beam 567*a* or 567*b*, and a second end of each louver link 574 to the corresponding carrier 569*a* or 569*b* for the louver. Pivot joints 575, any or all of which may be hinge joints, are indicated by small circles/ovals in FIGS. 14-18, but only a fraction of the pivot joints are expressly labeled with a reference number, to improve clarity.

Figure 15:
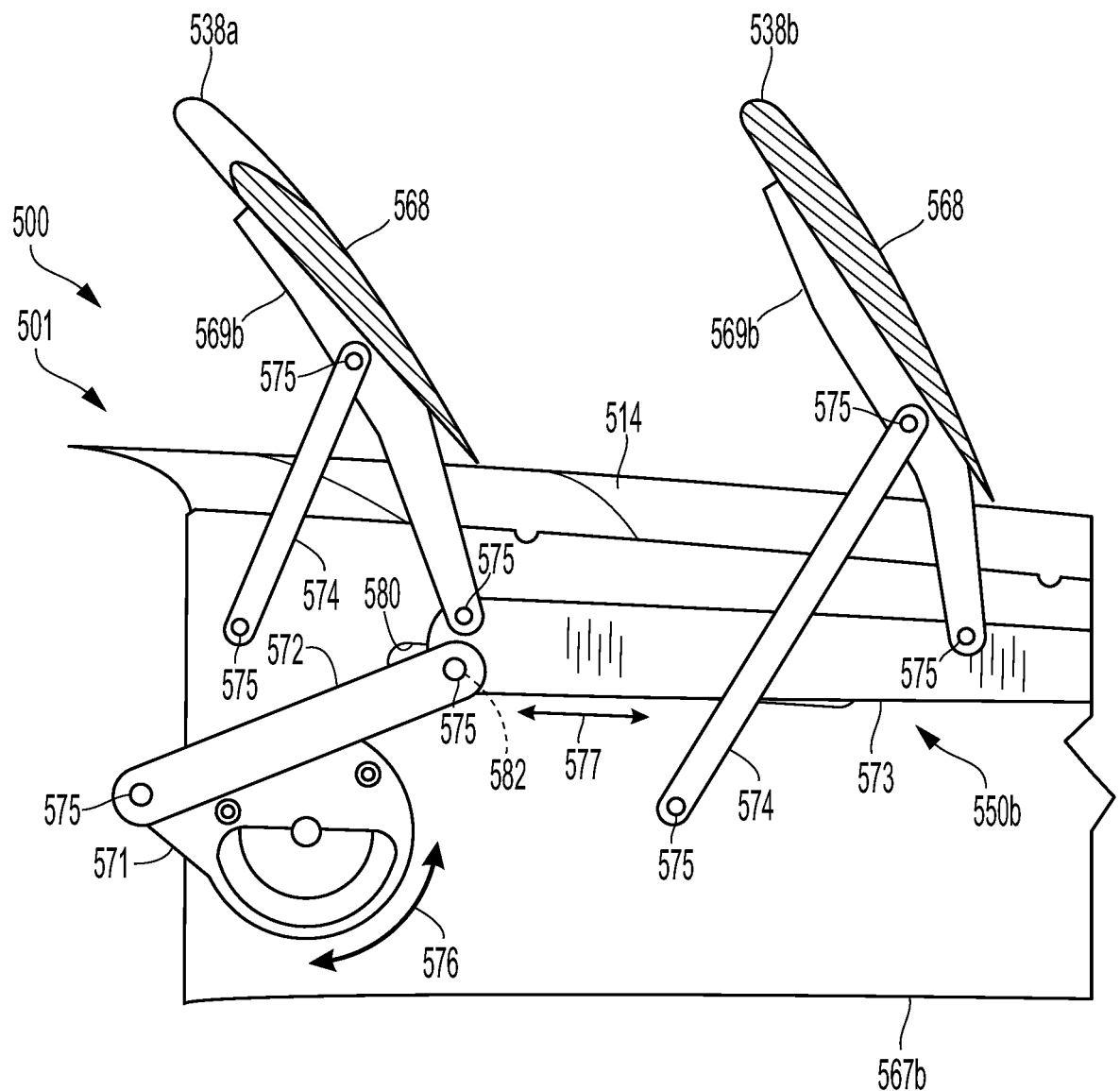
FIG. 15 is a fragmentary sectional view of the fan apparatus of FIG. 13, taken generally along line 15-15 in FIG. 13, except with each of the louvers of the cover in an almost fully open position.

Rotation of rotatable coupling 570 by actuator 548 drives rotation 576 of both cranks 571 (see FIGS. 14 and 15). This rotation transmits force from each crank 571 to the corresponding linkage bar 573 via crank link 572 (see FIG. 15). The force drives longitudinal travel 577 of each linkage bar 573 inside the corresponding beam 567*a*, 567*b*, which in turn produces both rotation and translation of each louver 538*a*-538*f* (compare FIGS. 16-18). Each crank 571 and adjacent crank link 572 form a respective cam to drive the longitudinal travel of linkage bar 573. The cam has a large arc to increase mechanical advantage. In other examples, the cams may be replaced by, or supplemented with, a different mechanism, such as a jack screw, timing belt, etc.

Figure 16:
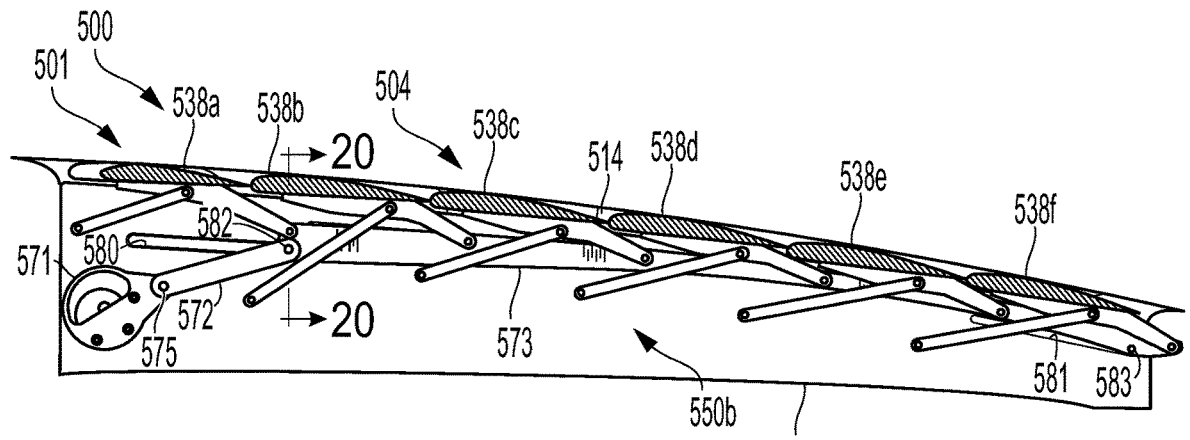
FIG. 16 is another fragmentary sectional view of the fan apparatus of FIG. 13, taken generally along line 16-16 in FIG. 13, with each of the louvers in a closed position.
Figure 17:
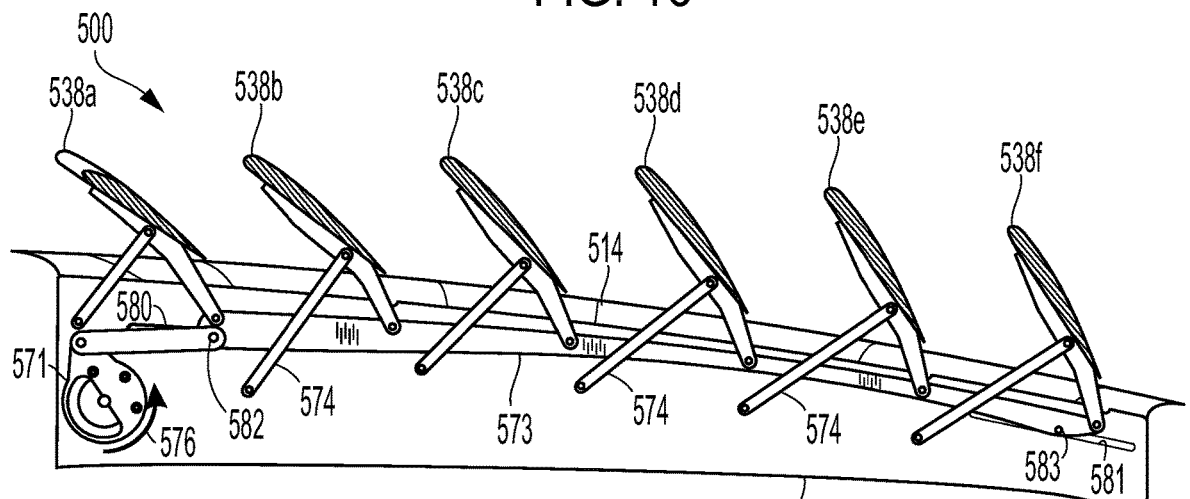
FIG. 17 is yet another fragmentary sectional view of the fan apparatus of FIG. 13, taken as in FIG. 16, except with each of the louvers in an intermediate position.
Figure 18:
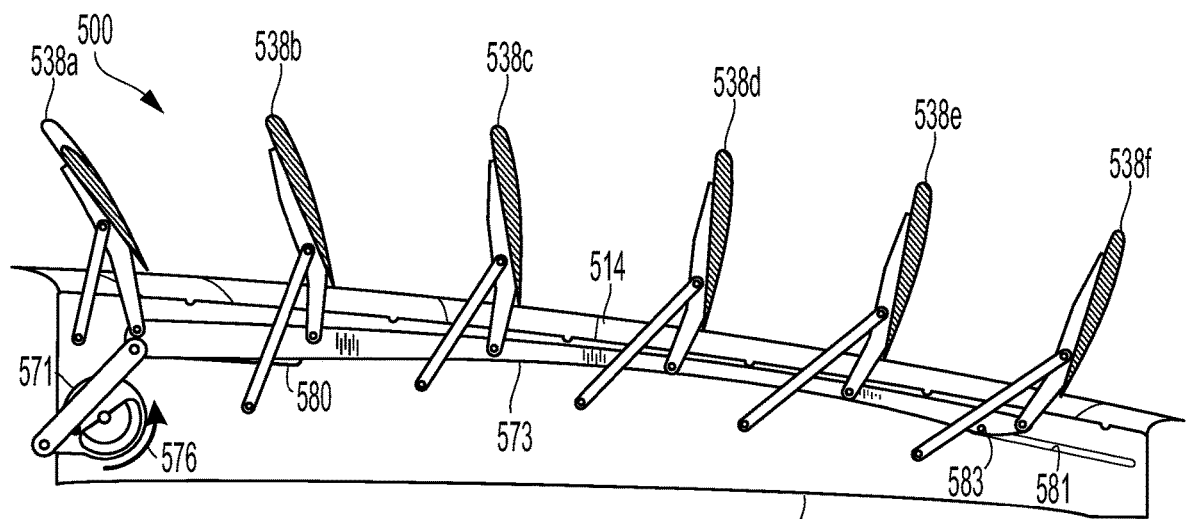
FIG. 18 is still another fragmentary sectional view of the fan apparatus of FIG. 13, taken as in FIG. 16, except with each of the louvers in a fully open position.

FIG. 16 shows louvers 538*a*-538*f* in a closed position of louvered cover 504. Adjacent pairs of louvers are in contact with one another along the leading/trailing edges of their vanes to form a seal that prevents airflow through the cover at positions between the louvers. For example, the vane of louver 538*b* has a leading edge that forms a seal with the trailing edge of the vane of louver 538*a*, and has a trailing edge that forms a seal with the leading edge of the vane of louver 538*c*.

Each linkage assembly 550*a*, 550*b* has an over-center configuration of crank 571 in the closed position of louvered cover 504. The over-center configuration maintains the louvered cover in the closed position without active assistance from actuator 548 (also see FIG. 14). The over-center configuration in FIG. 16 can be reached by rotating crank 571 clockwise, that is, opposite to (counter-clockwise) rotation 576 indicated in FIGS. 17 and 18. Once louvers 538*a*-538*f* are in their closed positions, the arm of the crank, and especially a pivot joint 575 connecting crank 571 to crank link 572, has passed a center point. Any opening force applied directly to the vanes of louvers 538*a*-538*f*, such as by airflow, now urges further clockwise rotation of crank 571. However, this clockwise rotation is blocked mechanically, which passively holds louvered cover 504 in the closed position until actuator 548 actively drives counter-clockwise rotation of crank 571. In other examples, the cam has more complex geometry such that the open position of the louvered cover also is maintained passively without active assistance from the actuator.

The rate of rotation of each louver 538*a*-538*f* is determined by the length and orientation of the corresponding louver links 574 (one in each linkage assembly 550*a*, 550*b*) for that louver. In the depicted embodiment, louvers 538*a*-538*f* are configured to rotate at different angular rates, with the rate of rotation progressively increasing from fore to aft along the series of louvers 538*a*-538*f*. This configuration is achieved by using louver links 574 of different lengths and/or different orientations. The configuration allows the louvers to have different orientations from one another in an intermediate (transitional) position (see FIG. 17; also see FIG. 12 and subsection B), and/or to fan out in the open position (see FIG. 18), for more efficiently guiding air into the duct during vertical flight.

Figure 19:
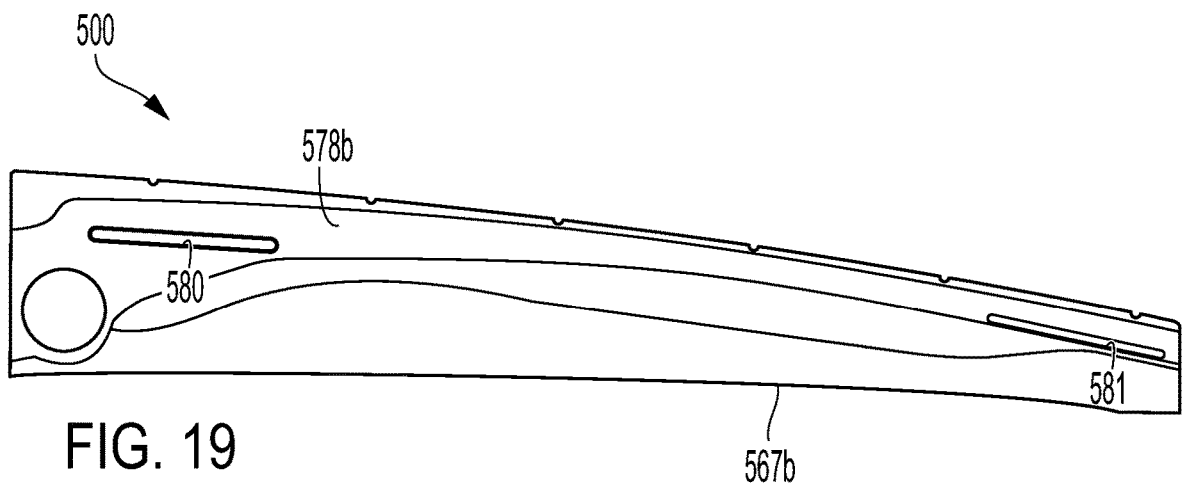
FIG. 19 is a sectional view of the beam of FIG. 14, taken as in FIG. 16 except in isolation.
Figure 20:
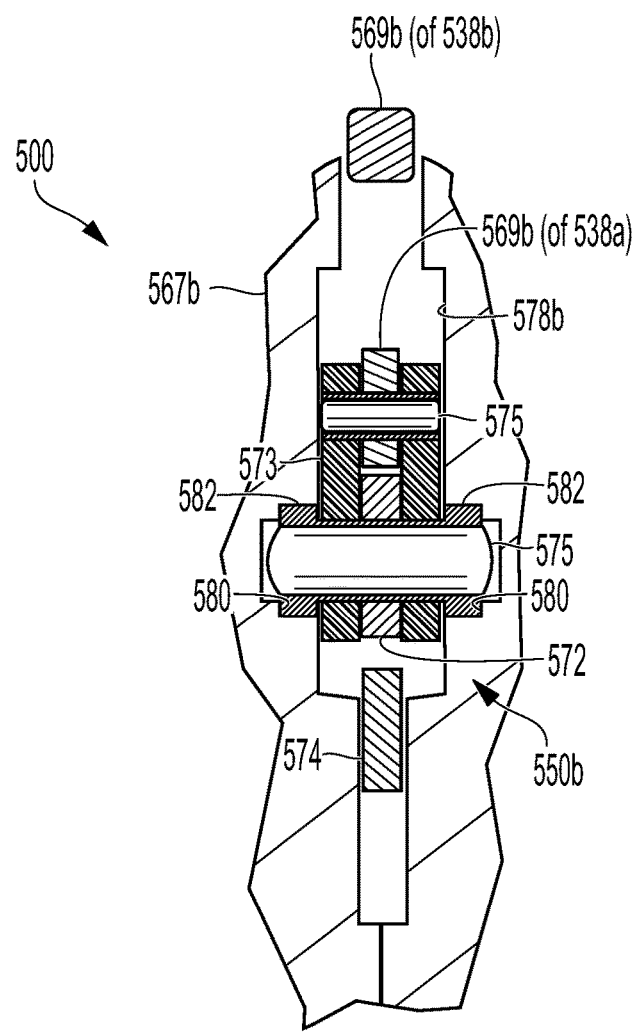
FIG. 20 is a fragmentary cross-sectional view of the beam and louver actuation assembly of FIG. 16, taken generally along line 20-20 of FIG. 16.

FIG. 19 shows a more detailed sectional side view of beam 567*b* taken in isolation, and FIG. 20 shows a cross-sectional view of beam 567*b* substantially housing linkage assembly 550*b* (also see FIG. 16). Each beam 567*a*, 567*b* defines a slot 578*a* or 578*b* that is elongated substantially parallel to a longitudinal axis 579 of the beam (also see FIG. 13). The slot is sized to permit linkage assembly 550*a* or 550*b* to be housed inside and substantially enclosed by the corresponding beam 567*a* or 567*b*. For example, crank 571, crank link 572, linkage bar 573, and louver links 574 of each linkage assembly 550*a* or 550*b* are each substantially housed inside the corresponding beam. Each linkage bar 573 travels along slot 578*a* or 578*b* (and longitudinal axis 579) inside the corresponding beam when louvers 538*a*-538*f* are actuated.

Each slot 578*a*, 578*b* is open on top (see FIGS. 13, 14, and 20). Louvers 538*a*-538*f* are separately coupled to beams 567*a*, 567*b*, and to linkage bars 573 housed in the beams, using louvers links 574 and carriers 569*a*, 569*b*, each of which extends out of beam 567*a* or 567*b* through the open top of slot 578*a* or 578*b* (also see FIGS. 16-18).

Each slot 578*a*, 578*b* includes a pair of forward guide channels 580 and a pair of aft guide channels 581 defined by opposite lateral walls of the slot (see FIGS. 19 and 20; only one aft guide channel 581 is visible). Linkage bar 573 includes and/or is attached to low-friction forward and aft slider elements 582, 583 that slide longitudinally in forward and aft guide channels 580, 581. This configuration provides smooth, mechanically efficient travel of linkage bar 573 along a predefined travel path in the beam. Forward and aft guide channels 580, 581 are elongated along nonparallel axes, which makes the predefined travel path curved instead of linear. A curved travel path can be beneficial to allow the linkage bar to follow a curved contour of the top of the duct. In other examples, fewer guide channels may be present, such as formed in only one lateral wall of each slot, and/or replacing each corresponding forward and aft pair of guide channels with a (longer) single guide channel, among others. Accordingly, each guide channel may be linear, as depicted in FIG. 19, or may be curved along its long axis.

D. Illustrative Fluid-Actuated Sealing Assembly and Method

An effective seal is needed for the peripheral edge of movable covers on aircraft, such as a louvered cover of a ducted lift fan. (Sealing between louvers is much less problematic and can be realized with a flexible flange extending along a leading or trailing edge of the louvers.) Without such a peripheral seal, there can be leakage airflow at the periphery of the cover during forward flight with the cover closed. For example, with a wing-embedded lift fan, this leakage airflow is through the duct, from the higher pressure bottom side to the lower pressure top side of the wing, resulting in aerodynamic losses. A louvered cover for a duct, when placed in a closed position, contacts an aerodynamically critical, convex surface at an opening of the duct. Any step or deviation in the smooth contour of the convex surface, to enable better sealing of the cover, could lead to detached airflow and therefore losses in performance when the cover is opened during transitional flight and/or hovering. When hovering, very high airflow occurs over the convex surface, resulting in low pressure (suction) on the convex surface. This suction could degrade the aerodynamic performance of the convex surface if part of the convex surface is made deformable to improve sealing. If a standard rubber gasket is used instead, the gasket requires a high amount of physical pressure to compress the gasket and ensure a tight seal. Accordingly, an actuation mechanism for a standard rubber gasket is too heavy to be practical for a VTOL aircraft. A new sealing system is needed for the louvered covers of VTOL aircraft This subsection describes aircraft 600 and 700 each having an illustrative fluid-actuated sealing system for a cover positioned at an opening of a duct or chamber, and an illustrative method 800 of forming a seal in an aircraft; see FIGS. 21-27. The sealing system enables efficient and lightweight sealing for a louvered cover at the circumference of the inlet lip of the duct.

Figure 21:
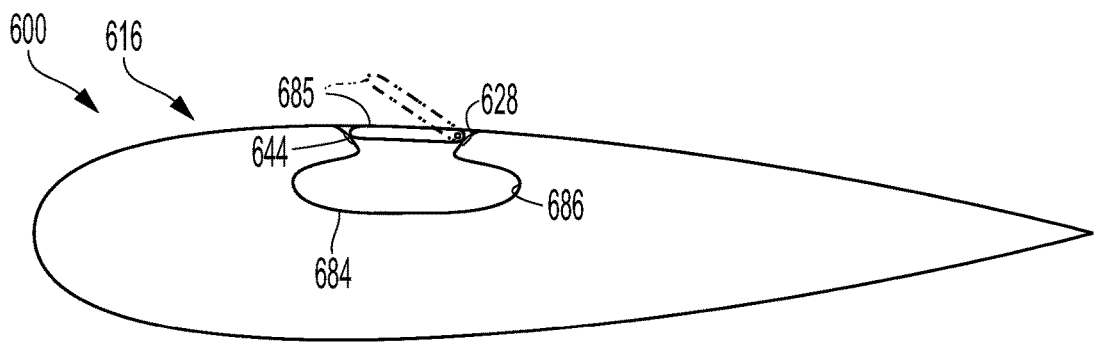
FIG. 21 is a schematic cross-sectional view of an airfoil structure of an aircraft, where the airfoil structure includes a chamber, a cover for the chamber, and a fluid-actuated sealing member to form a seal between the chamber and the cover.

FIG. 21 shows an airfoil structure 616 of aircraft 600. The airfoil structure includes a chamber 684 having an opening 628. A pivotable cover 685 is located at the opening and movable between a closed position, which is depicted with solid lines, and an open position, which is shown in phantom.

A sealing member 644 is attached to chamber 684 at a chamber wall 686 and at opening 628. Sealing member 644 is actuated as described below for aircraft 700, to form a seal, optionally a circumferential seal, with an edge of cover 685.

Figure 22:
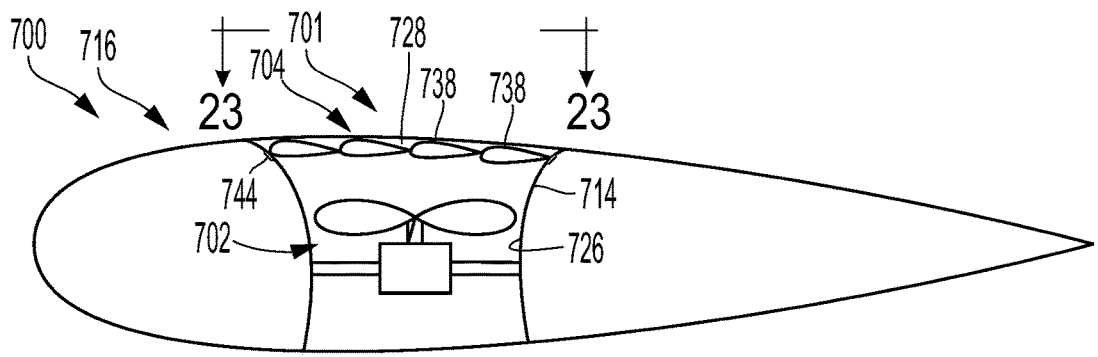
FIG. 22 is a schematic cross-sectional view of an airfoil structure of an aircraft, where the airfoil structure includes a fan apparatus having a duct containing a lift fan located under a louvered cover, and also includes a fluid-actuated sealing member to form a seal between a wall of the duct and the louvered cover.

FIG. 22 shows an airfoil structure 716 of an aircraft 700. The airfoil structure contains a fan apparatus 701. The fan apparatus includes a duct 714 containing a lift fan 702 and defining an inlet opening 728. A louvered cover 704 including louvers 738 is located at the opening and movable between an open position and a closed position.

A sealing member 744 is attached to duct 714 at a duct wall 726 thereof. The sealing member may be a thin rubber membrane that is embedded in an area of the duct wall where the louvers in closed positions would otherwise make contact with the duct wall itself. Sealing member 744 is actuated as described below to form a seal with an edge of one or more louvers 738 of louvered cover 704. The sealing member is formed of a flexible/deformable material, such as an elastically deformable material (e.g., rubber that is natural, synthetic (including an elastomer), or a combination thereof). The sealing member forms a seal and part of the aerodynamic surface at an opening of the duct.

Figures 23, 24:
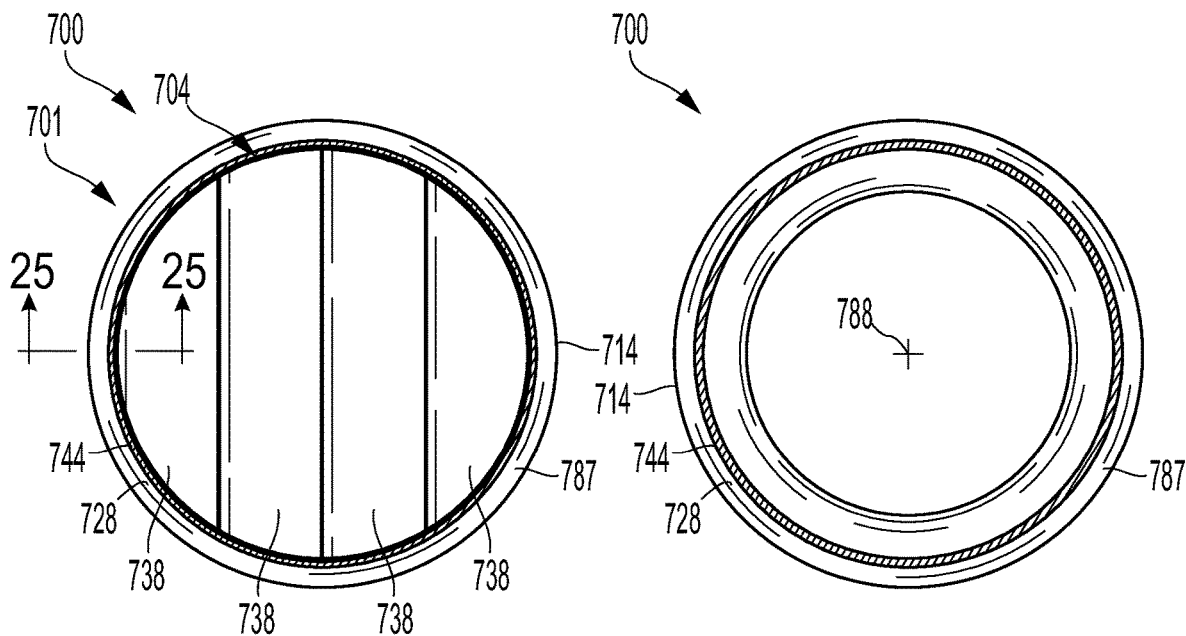
FIG. 23 is a top view of the fan apparatus of FIG. 22, taken generally along line 23-23 of FIG. 22.
FIG. 24 is another top view of the fan apparatus of FIG. 22, taken as in FIG. 23 except showing only the duct and the sealing member.

FIG. 23 shows a top view of fan apparatus 701 with louvered cover 704 in a closed position, and FIG. 24 shows the same view with the louvered cover and lift fan 702 removed. Sealing member 744 is positioned at a lip 787 of inlet opening 728 and defines at least part of the inlet opening. The sealing member may extend more than halfway or substantially completely, among others, around a central axis 788 defined by duct 714.

Figure 25:
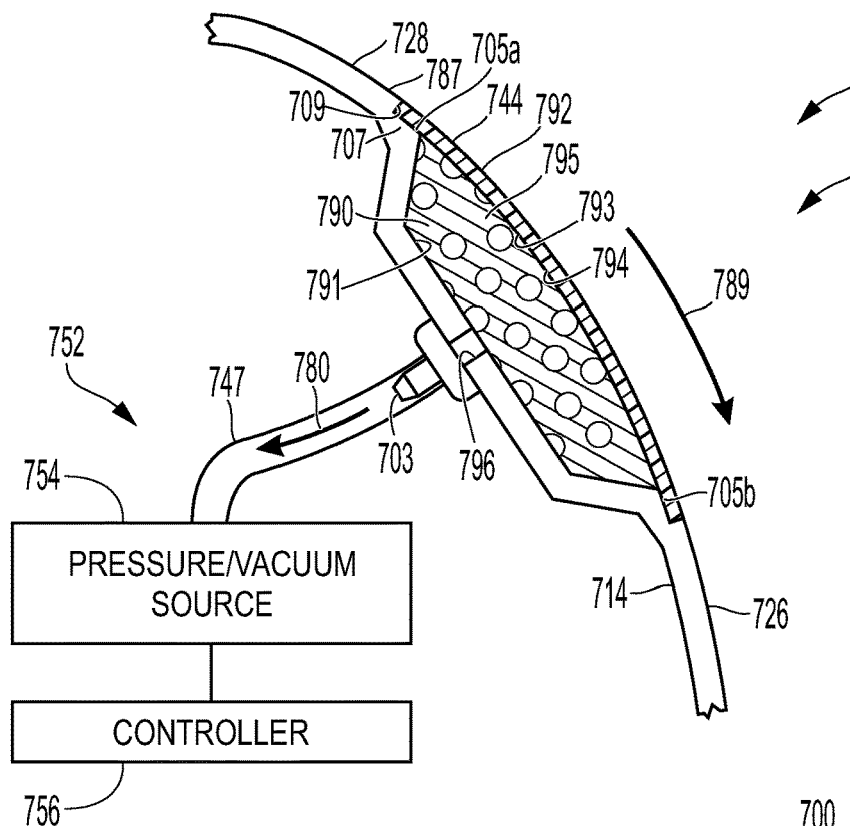
FIG. 25 is a fragmentary sectional view of the fan apparatus of FIG. 22, taken generally along line 25-25 of FIG. 23, except with the louvered cover in an open position, the lift fan driving airflow downward through the duct, and a pressure/vacuum source applying suction to the sealing member via a plenum.

FIG. 25 shows a fragmentary sectional view of fan apparatus 701 taken through duct 714 with the louvered cover in an open position (e.g., when the aircraft is hovering), and thus not visible here (also see FIGS. 22 and 23). The lift fan is driving airflow 789 through the duct. A sealing actuation assembly 752 including a pressure/vacuum source 754 is applying suction 780 to sealing member 744 via a plenum 790, to counteract suction created by airflow 789, which would otherwise deform sealing member 744 into a less aerodynamic shape. Suction 780 on sealing member 744 may be greater than the suction created by airflow 789. The pressure/vacuum source is operatively connected to a controller 756 and is in fluid communication with plenum 790 via piping 747 and a pneumatic fitting 703. Pressure/vacuum source 754 may have a single pump for fluid (e.g., an air pump) that is reversible to apply suction or (positive) pressure, or separate pumps for applying suction and pressure. In other examples, the pressure/vacuum source may be a pneumatic cylinder that is mechanically actuated, or a valve connected to another pressure/vacuum source(s) of the aircraft, such as a turbine.

Plenum 790 is formed collectively by duct 714 and sealing member 744. The duct defines a recess 791, such as an annular recess, in duct wall 726, and sealing member 744 is attached to the duct over the recess. The sealing member is bonded to duct wall 726 at a pair of indentations 705a, 705b formed by the duct wall along opposite edges of recess 791, such that the sealing member covers an open side of recess 791 to complete the plenum. Sealing member 744 is structured as a membrane having an outer surface 792 and an inner surface 793 opposite one another, with the outer surface being closer to central axis 788 of the duct (also see FIG. 24). The outer surface is flush with duct wall 726 to avoid any offset that would alter airflow along the duct wall. The inner surface provides a wall 794 of plenum 790. A portion of the inner surface may be bonded to a shoulder 707 formed by each indentation 705a, 705b, and an edge of sealing member 744 may be bonded to a wall 709 of each indentation 705a, 705b. The depth of each indentation 705a, 705b matches the thickness of sealing member 744.

Plenum 790 contains a porous material 795, interchangeably called a porous insert. The porous insert may be a single piece, a series of pieces arranged along the plenum and each having a cross-sectional shape matching that of the plenum, or pellets/particles, among others.

Porous material 795 is sufficiently permeable to permit fluid to flow through the porous material between a port 796 of the plenum and wall 794 of sealing member 744, to push the sealing member with fluid pressure or pull the sealing member with fluid suction. Plenum 790 is substantially filled with porous material 795, which advantageously limits movement of sealing member 744 toward the plenum when suction is applied to the plenum. Sealing member 744 is urged against the porous material under suction during hovering of the aircraft, which holds sealing member 744 in an aerodynamic shape relative to adjacent duct wall 726. The porous material also ensures that suction is applied to sealing member 744 uniformly along its length.

Any suitable fluid may be used to apply pressure and suction with pressure/vacuum source 754. The fluid may be gaseous (e.g., air, nitrogen, carbon dioxide, or the like) or liquid (e.g., oil or water). Accordingly, sealing actuation assembly 752 may be pneumatic or hydraulic.

Figure 26:
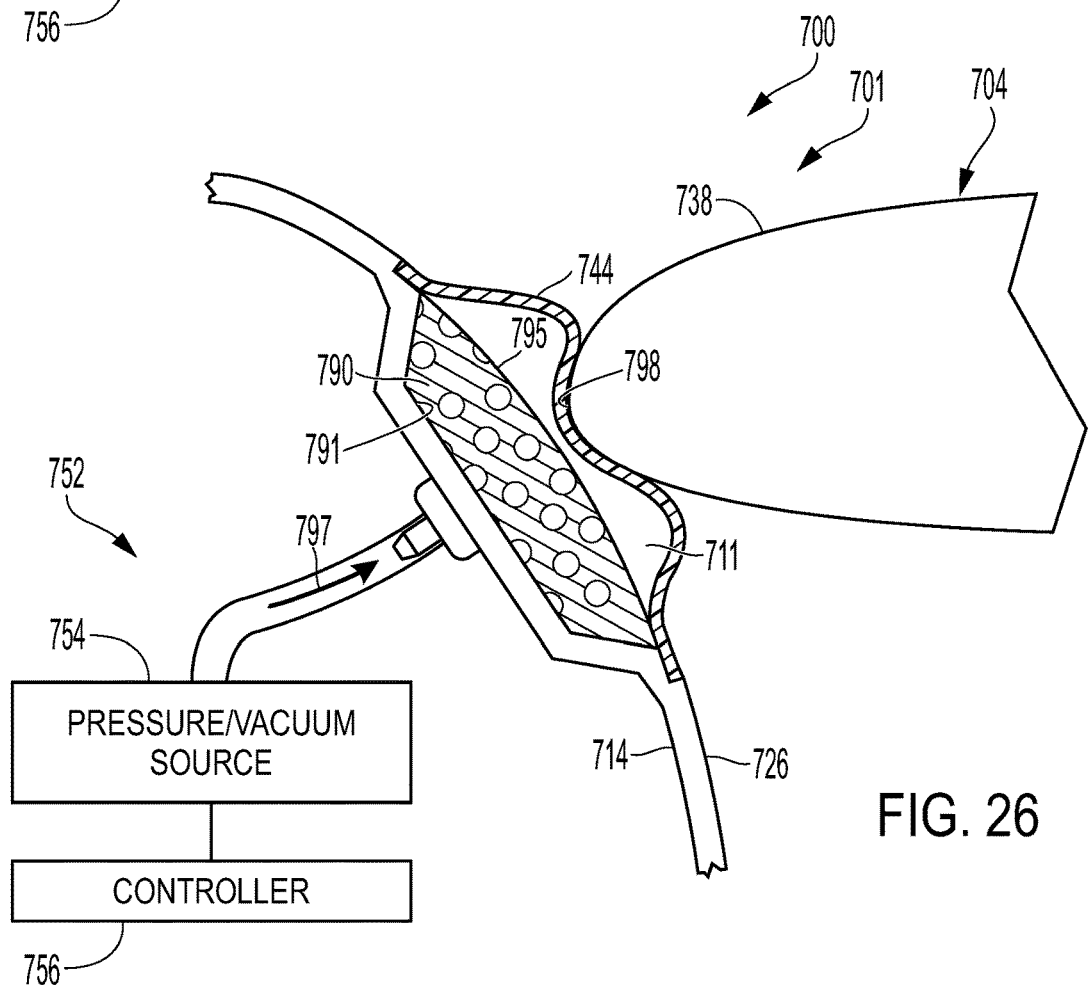
FIG. 26 is another fragmentary sectional view of the fan apparatus of FIG. 22, taken as in FIG. 25 except with the louvered cover in a closed position and the pressure/vacuum source pressurizing the plenum to urge the sealing member against an edge of the louvered cover.

FIG. 26 shows another fragmentary sectional view of fan apparatus 701, as in FIG. 25, except with the louvered cover 704 in a closed position, taken during forward flight of aircraft 700. Sealing actuation assembly 752 is pressurizing plenum 790, by applying fluid pressure 797 to the plenum and sealing member 744. The fluid pressure urges sealing member 744 away from recess 791 and against an edge 798 of one or more louvers 738 of louvered cover 704. The deformability of sealing member 744 allows it to conform to the local contours of louvers 738, thereby creating a fluid tight seal at the interface. A gap 711 may be formed between porous material 795 and sealing member 744 in some examples when the plenum is pressurized.

Figure 27:
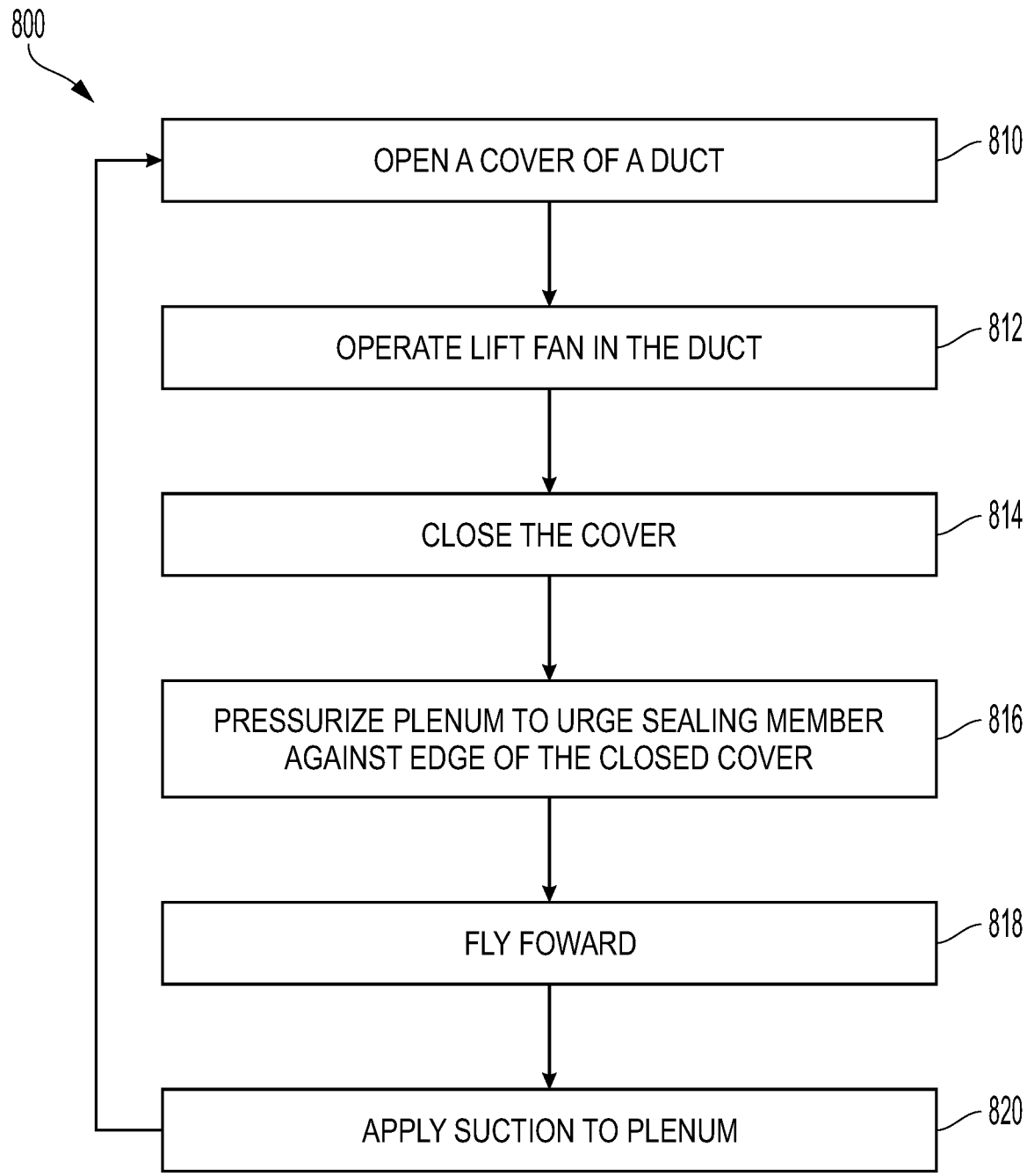
FIG. 27 is a flowchart depicting steps of an illustrative method of forming a seal in an aircraft.

FIG. 27 is a flowchart depicting steps of an illustrative method 800 of forming a seal in an aircraft, and may not recite all steps of the method. The steps listed in the flowchart may be performed in any suitable order and combination (including simultaneously) using any of the aircraft, systems, apparatus, and devices of the present disclosure. Any of the steps may be omitted from the method.

At step 810, a cover of a duct (or chamber) is opened. The duct (or chamber) may be included in an airfoil structure, such as a wing, of an aircraft, and may be situated at an opening (an inlet opening or outlet opening) of the duct (or chamber). The cover may or may not be a louvered cover including a plurality of louvers. The cover may be opened partially to an intermediate (transitional) position and/or fully to an open position, to permit airflow into the duct (or chamber)

At step 812, a lift fan mounted in the duct is operated. The lift fan may be operated during a vertical flight mode of the aircraft. The lift fan may be activated before or after step 810, depending on the phase of flight.

At step 814, the cover is closed (i.e., moved to a closed position). The cover may be closed using any suitable actuation assembly. For example, the cover may be closed by moving each louver of a plurality of louvers of the cover to a closed position, to substantially exclude airflow into or out of the duct or chamber via the opening.

At step 816, a plenum is pressurized to urge a sealing member against an edge of the cover. The plenum may be formed collectively by a wall(s) of the duct (or chamber) and the sealing member. Step 816 may form a substantially circumferential seal between the cover and the sealing member, to more completely exclude airflow into or out of the opening of the duct or chamber. In some examples, a seal may be formed between the sealing member and an edge of each louver of a plurality of louvers of the cover.

At step 818, the aircraft flies forward (in a horizontal flight mode). The aircraft may fly forward with the cover closed and sealed, while airflow into or out of the duct (or chamber) is restricted or prevented by the seal between the sealing member and the cover.

At step 820, suction is applied to the plenum. With suction applied, the sealing member maintains its aerodynamic shape and position when the cover is opened, such as at step 810. Step 820 may be performed before, during, or after step 810.

E. Illustrative Method of Controlling Airflow

Figure 28:
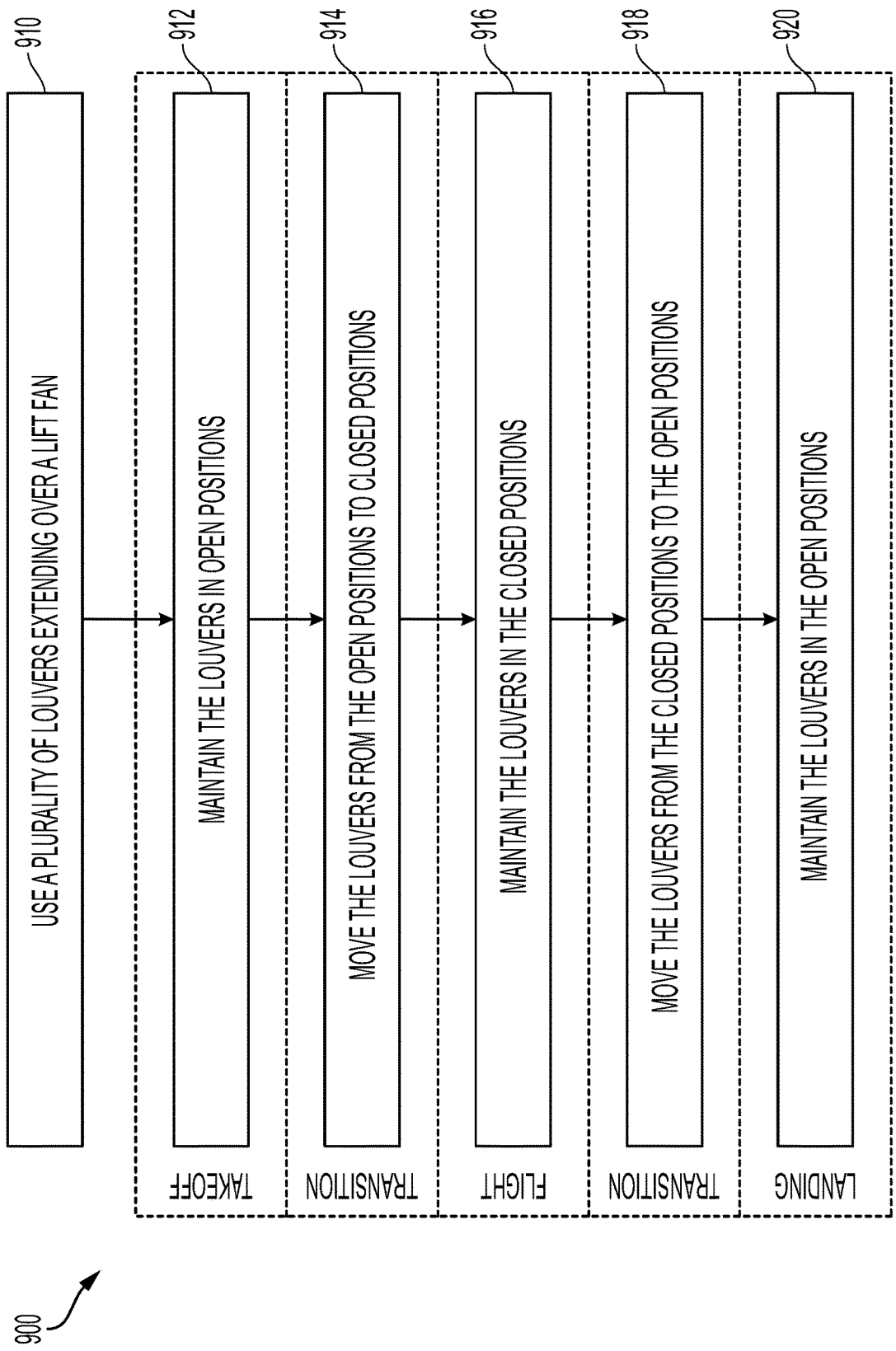
FIG. 28 is a flowchart depicting steps of an illustrative method of controlling airflow into a lift fan.

This section describes steps of an illustrative method 900 of controlling airflow into a lift fan; see FIG. 28. Aspects of aircraft, fans, and/or fan covers described above may be utilized in the method steps described below. Where appropriate, reference may be made to components and systems that may be used in carrying out each step. These references are for illustration, and are not intended to limit the possible ways of carrying out any particular step of the method.

FIG. 28 is a flowchart illustrating steps performed in an illustrative method, and may not recite the complete process or all steps of the method. Although various steps of method 900 are described below and depicted in FIG. 28, the steps need not necessarily all be performed, and in some cases may be performed simultaneously or in a different order than the order shown.

At step 910, the method includes using a plurality of louvers extending over the lift fan. The lift fan may be mounted in a duct in an airfoil, such as the wing of a VTOL aircraft. Together the louvers may comprise a fan cover, and may be operatively linked by an actuation system. The louvers may be positioned at an inlet opening of the duct. Each louver may span the inlet opening, and may have an airfoil shape configured to direct airflow alternately over or into the inlet opening.

The louvers may be actuated to alter the volume of air that enters the fan duct. The louvers may be controlled by a flight control system of the aircraft as part of flight phases such as takeoff and landing, climbing and descent, and/or cruising and maneuvering. Steps 912-920 of method 900 may each be performed according to and/or as part of a phase of flight, as indicated in FIG. 28.

Step 912 may be performed during takeoff and/or hover, and includes maintaining the louvers in open positions. In the open positions, the louvers may be configured to direct air from above the duct through the inlet opening into the duct. Distal portions of the louvers may extend above the duct and surrounding airfoil surface, and each louver may extend at a different angle in order to entrain air from a wide range of angles. Angles of the louver may vary from a forward (fore) end of the duct to a rear (aft) end of the duct, and in some examples may vary linearly by approximately thirty degrees or more. A longitudinally central louver may be approximately vertical, while fore louvers rotate open to less than a vertical position and aft louvers rotate past the vertical position.

Step 914 may be performed during transition from hover to horizontal flight, and includes moving the louvers from open to closed positions. As the aircraft transitions between vertical (hovering) and horizontal flight, incoming airflow may be generated by horizontal acceleration as well as vertical suction of the fan, and the angle of incoming airflow at the duct may change. The louvers may be rotated to match the changing angle of incoming airflow and effectively turn the air in order to maintain airflow into the lift fan.

The louvers may be rotated such that each remains at approximately a zero angle of attack to the incoming airflow as the incoming airflow changes, or at least such that an angle of attack between positive and negative 10 degrees is maintained.

The louvers may be rotated through a limited angular range, from an orientation selected to maximize air entrainment in the open position to a near-horizontal orientation in the closed position. Each louver may rotate through a different angular range, and may rotate at a different angular rate. In the present example the angular ranges may be between approximately 70 and 110 degrees. In some examples, the angular ranges may be between approximately 50 and 130 degrees.

The louvers may be rotated at a constant rate from the open position to the closed position, may be rotated in stages, and/or may be rotated in any manner consistent with desired flight control. For example, the aircraft may transition directly from vertical to horizontal flight modes, or the aircraft may operate for an extended period in the transitional mode.

Step 916 may be performed during horizontal or wingborne flight, and includes maintaining the louvers in the closed positions. In flight, the lift fan may be off and incoming airflow may result only from horizontal acceleration. In the closed positions, the louvers may be configured to direct the incoming airflow over the airfoil surface and exclude the incoming airflow from the inlet opening of the duct. The louvers may lie approximately flush with the airfoil surface, and substantially cover the inlet opening of the duct.

Step 918 may be performed during transition from horizontal flight to hover, and includes moving the louvers from the closed positions to the open positions. As the aircraft transitions between horizontal flight and hover, incoming airflow may be generated by vertical suction of the fan as well as by horizontal acceleration, and the angle of incoming airflow at the duct may change. The orientations of the louvers may be changed to allow air into the inlet opening to supply the lift fan, and to match the changing angle of the incoming airflow.

Step 920 may be performed during hover and/or landing, and includes maintaining the louvers in the open positions. The open positions of the louvers may be the same as maintained in step 912 during takeoff. Method 900 may be repeated, and/or any of steps 912-920 performed as needed during operation of the aircraft to effectively control airflow into the lift fan.

F. Illustrative Aircraft and Associated Method

Figure 29:
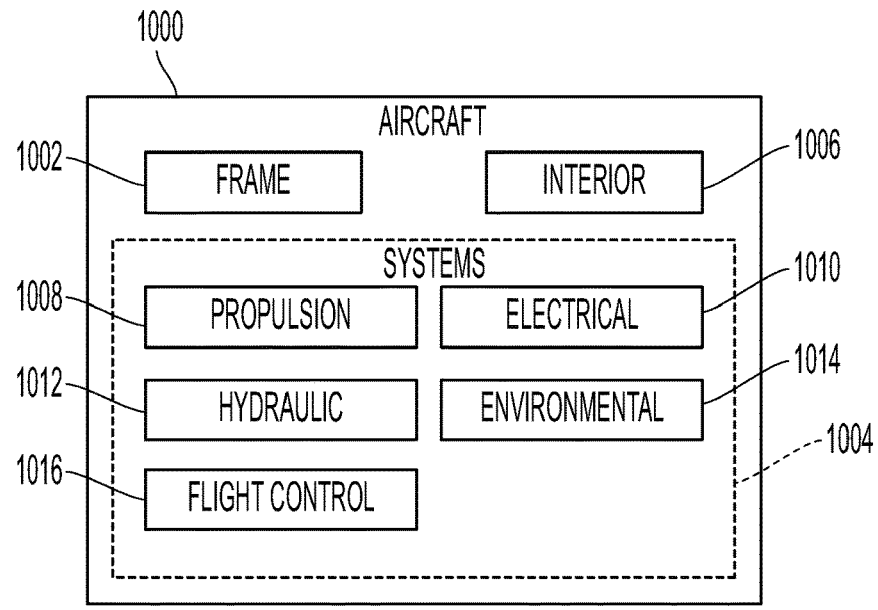
FIG. 29 is a schematic diagram of an illustrative aircraft.
Figure 30:
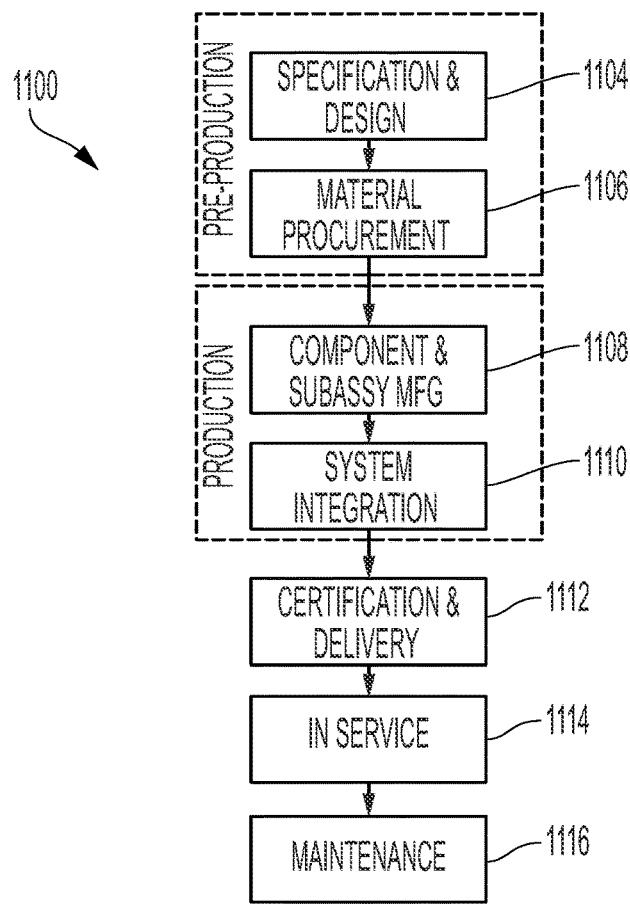
FIG. 30 is a flowchart depicting steps of an illustrative aircraft manufacturing and service method.

Examples disclosed herein may be described in the context of an illustrative aircraft 1000 (see FIG. 29), such as any of the VTOL aircraft disclosed herein, and an illustrative aircraft manufacturing and service method 1100 (see FIG. 30). Method 1100 includes a plurality of processes, stages, or phases. During pre-production, method 1100 may include a specification and design phase 1104 of aircraft 1000 and a material procurement phase 1106. During production, a component and subassembly manufacturing phase 1108 and a system integration phase 1110 of aircraft 1000 may take place. Thereafter, aircraft 1000 may go through a certification and delivery phase 1112 to be placed into in-service phase 1114. While in service (e.g., by an operator), aircraft 1000 may be scheduled for routine maintenance and service phase 1116 (which may also include modification, reconfiguration, refurbishment, and so on of one or more systems of aircraft 1000). While the examples described herein relate generally to operational use during in-service phase 1114 of aircraft 1000, they may be practiced at other stages of method 1100.

Each of the processes of method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 29, aircraft 1000 produced by illustrative method 1100 may include a frame 1002 with a plurality of systems 1004 and an interior 1006. Examples of plurality of systems 1004 include one or more of a propulsion system 1008, an electrical system 1010, a hydraulic system 1012, an environmental system 1014, and a flight control system 1016. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 1000, the principles disclosed herein may apply to other vehicles, e.g., land vehicles, marine vehicles, etc.

Apparatuses and methods shown or described herein may be employed during any one or more of the stages of the aircraft manufacturing and service method 1100. For example, components or subassemblies corresponding to component and subassembly manufacturing phase 1108 may be fabricated or manufactured in a manner similar to components or subassemblies produced while aircraft 1000 is operating during in-service phase 1114. Also, one or more examples of the apparatuses, methods, or combinations thereof may be utilized during manufacturing phase 1108 and system integration phase 1110, for example, by substantially expediting assembly of or reducing the cost of aircraft 1000. Similarly, one or more examples of the apparatus or method realizations, or a combination thereof, may be utilized, for example and without limitation, while aircraft 1000 is in in-service phase 1114 and/or during maintenance and service phase 1116.

Illustrative Combinations and Additional Examples

This section describes additional aspects and features of the systems, apparatuses, and methods of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A fan apparatus, comprising: (i) a duct having an opening; (ii) a lift fan mounted in the duct; and (iii) a series of louvers positioned at the opening and each configured to move between an open position and a closed position, the louvers being offset from one another along a fore-to-aft axis; and wherein the series of louvers includes a fore louver and an aft louver, and wherein a chord length of the aft louver is greater than a chord length of the fore louver.

A2. The fan apparatus of paragraph A1, where a chord length of the louvers increases successively from fore to aft along the series of louvers.

A3. The fan apparatus of paragraph A2, wherein the chord length of the louvers increases substantially linearly from fore to aft along the series of louvers.

A4. The fan apparatus of any of paragraphs A1 to A3, wherein a chord length of the louvers varies by at least 10%, 25%, or 50% among the louvers.

A5. The fan apparatus of any of paragraphs A1 to A4, wherein the louvers are positioned at an inlet opening of the duct.

A6. An aircraft, comprising: the fan apparatus of any of paragraphs A1 to A5; and an airfoil structure containing the fan apparatus; wherein each louver of the series of louvers is configured to move between the open position and the closed position when the aircraft transitions between a horizontal flight mode and a vertical flight mode.

A7. The fan apparatus or aircraft of any of paragraphs A1 to A6, further comprising any limitation(s) of any other paragraph(s) of this section.

B1. An aircraft, comprising: (i) an airfoil structure including a duct having an opening; (ii) a lift fan mounted in the duct; and (iii) a series of louvers positioned at the opening and each configured to move between an open position and a closed position via an intermediate position when the aircraft transitions between a horizontal flight mode and a vertical flight mode, the louvers being offset from one another along a fore-to-aft axis; wherein the louvers include a fore louver and an aft louver, and wherein, in the intermediate position, the aft louver projects farther out of the duct than the fore louver.

B2. The aircraft of paragraph B1, where each louver in the intermediate position projects a projection distance out of the duct, and wherein the projection distance of the louvers increases progressively from fore to aft along the series of louvers.

B3. The aircraft of paragraph B2, wherein the projection distance of the louvers in the intermediate position increases substantially linearly from fore to aft along the series of louvers.

B4. The aircraft of any of paragraphs B1 to B3, wherein a projection distance of the louvers in the intermediate position varies by at least 10%, 25%, or 50% among the louvers.

B5. The aircraft of any of paragraphs B1 to B4, wherein the louvers are positioned at an inlet opening of the duct.

B6. The aircraft of any of paragraphs B1 to B5, further comprising any limitation(s) of any other paragraph(s) of this section.

C1. A method of controlling airflow with respect to an airfoil structure containing a lift fan mounted in a duct, during a transition phase between horizontal and vertical flight modes of an aircraft, the method comprising: (i) moving each louver of a series of louvers located at an opening of the duct between an open or closed position and an intermediate position; (ii) wherein, in the intermediate position, an aft louver of the series projects farther out of the duct than a fore louver of the series.

C2. The method of paragraph C1, wherein moving each louver includes moving a series of louvers located at an inlet opening of the duct.

C3. The method of paragraph C1 or C2, wherein moving each louver includes moving an aft louver of the series having a greater chord length than a fore louver of the series.

C4. The method of paragraph C3, wherein moving each louver includes moving a series of louvers having a chords length that increases successively from fore to aft along the series of louvers.

C5. The method of paragraph C3 or C4, wherein moving an aft louver includes moving an aft louver having a chord length that is at least 10%, 25%, 50%, or 100% greater than a chord length of a fore louver.

C6. The method of any of paragraphs C1 to C5, further comprising flying the aircraft forward prior to moving each louver.

C7. The method of any of paragraphs C1 to C6, further comprising flying the aircraft forward after moving each louver.

C8. The method of any of paragraphs C1 to C7, further comprising landing the aircraft vertically after moving each louver.

C9. The method of any of paragraphs C1 to C8, further comprising taking off vertically in the aircraft prior to moving each louver.

C10. The method of paragraph C1, wherein moving each louver includes moving one or more of the louvers translationally and rotationally.

C11. The method of any of paragraphs C1 to C10, further comprising any limitation(s) of any other paragraph(s) of this section.

D1. A fan apparatus, comprising: (i) an airfoil structure including a duct having a duct opening; (ii) a lift fan mounted in the duct; and (iii) a plurality of louvers positioned at the duct opening, each louver being configured to move between an open position and a closed position, wherein the closed position is rotationally offset and translationally offset from the open position.

D2. The fan apparatus of paragraph D1, further comprising a beam fixed to and spanning the duct, wherein each louver is coupled to the beam using a respective louver link that is pivotably coupled to the beam at a first end of the louver link and pivotably coupled to the louver at a second end of the louver link.

D3. The fan apparatus of paragraph D1 or D2, wherein the beam has an airfoil shape.

D4. The fan apparatus of paragraph D2 or D3, further comprising a linkage bar pivotably coupled to each of the louvers, wherein the beam defines a guide channel, and wherein the linkage bar slides along the guide channel when each louver moves between an open position and a closed position.

D5. The fan apparatus of paragraph D4, wherein the linkage bar slides inside the beam when the plurality of louvers move between an open position and a closed position.

D6. The fan apparatus of any of paragraphs D1 to D5, further comprising a linkage bar pivotably coupled to each of the louvers, and an actuator configured to drive travel of the linkage bar, to move the plurality of louvers between the open and closed positions, wherein the actuator is coupled to the linkage bar by a crank that is rotated by the actuator.

D7. The fan apparatus of paragraph D6, wherein the crank is coupled to the linkage bar using a crank link that is pivotably coupled to the crank at a first end of the crank link and pivotably coupled to the linkage bar at a second end of the crank link.

D8. The fan apparatus of any of paragraphs D1 to D7, further comprising an actuation assembly configured to drive each louver between an open position and a closed position, wherein the actuation assembly includes an actuator (such as a motor) and a linkage assembly that couples the actuator to each louver, and wherein the linkage assembly is configured to maintain the louvers in the closed positions without active assistance from the actuator.

D9. An aircraft, comprising: the fan apparatus of any of paragraphs D1 to D8; and an airfoil structure containing the fan apparatus; wherein each louver is configured to move between the open position and the closed position when the aircraft transitions between a vertical flight mode and a horizontal flight mode.

D10. The fan apparatus or aircraft of any of paragraphs D1 to D9, further comprising any limitation(s) of any other paragraph(s) of this section.

E1. An aircraft, comprising: (i) an airfoil structure including a duct having a duct opening; (ii) a lift fan mounted in the duct; (iii) a beam fixed to and spanning the duct; (iv) a linkage bar substantially enclosed by the beam; (v) a plurality of louvers positioned at the duct opening and each coupled to the linkage bar; and (vi) an actuator configured to drive longitudinal travel of the linkage bar in the beam, such that each louver moves between an open position and a closed position when the aircraft transitions from a vertical flight mode to a horizontal flight mode E2. The aircraft of paragraph E1, wherein the actuator is coupled to the linkage bar using a crank that is rotated by the actuator.

E3. The aircraft of paragraph E2, wherein the crank is coupled to the linkage bar using a crank link that is pivotably coupled to the crank at a first end of the crank link and pivotably coupled to the linkage bar at a second end of the crank link.

E4. The aircraft of any of paragraphs E1 to E3, wherein each louver is coupled to the beam using a respective louver link having pivot joints at opposite ends of the respective louver link.

E5. The aircraft of any of paragraphs E1 to E4, wherein each louver is pivotably coupled to the linkage bar.

E6. The aircraft of any of paragraphs E1 to E5, wherein the beam has an airfoil shape.

E7. The aircraft of any of paragraphs E1 to E6, wherein the beam defines an internal guide channel, and wherein the linkage bar includes or is attached to a slider element that slides along the internal guide channel when the linkage bar is driven longitudinally by the actuator.

E8. The aircraft of any of paragraphs E1 to E7, further comprising any limitation(s) of any other paragraph(s) of this section.

F1. A method of controlling airflow with respect to an airfoil structure containing a lift fan mounted in a duct, the method comprising: moving each louver of a plurality of louvers located at an opening of the duct between an open position and a closed position, the closed position being rotationally offset and translationally offset from the open position.

F2. The method of paragraph F1, wherein moving is performed during a transition phase between a vertical flight mode and a horizontal flight mode of an aircraft including the airfoil structure.

F3. The method of paragraph F1 or F2, wherein each louver is pivotably coupled to a linkage bar, and wherein moving includes driving longitudinal motion of the linkage bar inside a beam that is fixed to and spans the duct.

F4. The method of paragraph F3, wherein the beam defines a guide channel located inside the beam, and wherein driving includes sliding the linkage bar along the guide channel.

F5. The method of any of paragraphs F1 to F4, wherein a beam is fixed to and spans the duct, wherein each louver is connected to the beam via a respective louver link having pivot joints at opposite ends of the louver link, and wherein moving includes rotating each respective louver link relative to the beam.

F6. The method of paragraph F5, wherein each louver is pivotably coupled to a linkage bar, and wherein rotating each respective louver link includes rotating the respective louver link relative to the beam and the linkage bar as the linkage bar travels along the beam.

F7. The method of any of paragraphs F1 to F6, wherein each louver is pivotably coupled to the same linkage bar, and wherein moving includes operating an actuator that rotates a crank connected to the linkage bar using a crank link.

F8. The method of any of paragraphs F1 to F7, further comprising any limitation(s) of any other paragraph(s) of this section.

G1. A fan apparatus, comprising: (i) a duct having a duct opening; (ii) a sealing member (optionally an elastic/flexible sealing member) attached to the duct at the duct opening and forming a wall of a plenum (optionally an expandable plenum); (iii) a fan mounted in the duct; (iv) a plurality of louvers positioned at the duct opening, each louver having an open position and a closed position; and (v) a pressure source configured to pressurize the plenum such that the sealing member is urged against an edge of one or more of the louvers in the closed position.

G2. The fan apparatus of paragraph G1, wherein the sealing member is composed of (natural and/or synthetic) rubber.

G3. The fan apparatus of paragraph G1 or G2, wherein the plenum contains a porous material, and wherein the porous material substantially fills the plenum when the pressure source is not pressurizing the plenum.

G4. The fan apparatus of any of paragraphs G1 to G3, wherein the fan apparatus includes a vacuum source configured to apply suction to the plenum when each louver is in the open position.

G5. The fan apparatus of any of paragraphs G1 to G4, wherein the sealing member extends more than halfway around a central axis of the duct.

G6. The fan apparatus of any of paragraphs G1 to G5, further comprising a louver actuation assembly configured to open and close the louvers and a controller configured to coordinate operation of the louver actuation assembly with operation of the pressure source.

G7. The fan apparatus of any of paragraphs G1 to G6, wherein the duct has a duct wall adjacent the sealing member, and wherein a surface of the sealing member opposite the wall of the plenum is flush with the duct wall.

G8. The fan apparatus of any of paragraphs G1 to G7, wherein the duct is included in an airfoil structure of an aircraft.

G9. The fan apparatus of any of paragraphs G1 to G8, further comprising any limitation(s) of any other paragraph(s) of this section.

H1. An aircraft, comprising: (i) an airfoil structure including a duct or chamber having an opening; (ii) a cover positioned at the opening and having an open position and a closed position; (iii) a sealing member located at a lip of the opening and forming a wall of a plenum (optionally an expandable plenum); and (iv) a pressure source configured to pressurize the plenum such that the sealing member is urged against an edge of the cover in the closed position.

H2. The aircraft of paragraph H1, wherein the airfoil structure is a wing of the aircraft, and wherein the duct or chamber is a duct, further comprising a lift fan mounted in the duct.

H3. The aircraft of paragraph H1 or H2, wherein the cover includes a plurality of louvers.

H4. The aircraft of any of paragraphs H1 to H3, wherein the sealing member is composed of rubber.

H5. The aircraft of any of paragraphs H1 to H4, wherein the plenum contains a porous material.

H6. The aircraft of any of paragraphs H1 to H5, wherein the aircraft includes a vacuum source configured to apply suction to the plenum when the cover is in the open position.

H7. The aircraft of paragraph H6, wherein the pressure source includes a pump for fluid.

H8. The aircraft of any of paragraphs H1 to H7, wherein the sealing member extends more than halfway around the opening of the duct or chamber.

H9. The aircraft of any of paragraphs H1 to H8, further comprising a controller configured to coordinate (a) operation of an actuation assembly to open and close the cover with (b) operation of the pressure source (and/or the vacuum source).

H10. The aircraft of any of paragraphs H1 to H9, wherein the duct or chamber has a duct wall or a chamber wall adjacent the sealing member, wherein the sealing member has a surface opposite the wall of the plenum, and wherein the surface of the sealing member is flush with the duct wall or the chamber wall.

H11. The aircraft of any of paragraphs H1 to H10, further comprising any limitation(s) of any other paragraph(s) of this section.

I1. An aircraft, comprising: (i) an airfoil structure including a duct having a duct opening; (ii) a sealing member located at a lip of the duct opening and forming a wall of a plenum (optionally an expandable plenum); (iii) a lift fan mounted in the duct; (iv) a plurality of louvers positioned at the duct opening and each configured to move between an open position and a closed position when the aircraft transitions between a vertical flight mode and a horizontal flight mode; and (v) a pressure source configured to pressurize the plenum such that the sealing member is urged against an edge of one or more of the louvers in the closed position.

I2. The aircraft of paragraph I1, wherein the aircraft includes a vacuum source configured to apply suction to the plenum when the plurality of louvers are in the open position.

I3. The aircraft of paragraph I2, wherein the plenum contains a porous material, and wherein the sealing member is configured to be urged against the porous material when the vacuum source applies suction to the plenum.

I4. The aircraft of any of paragraphs I1 to I3, further comprising any limitation(s) of any other paragraph(s) of this section.

J1. A method of creating a seal in an aircraft, the method comprising: (i) closing a cover at an opening of a duct or chamber of the aircraft to position an edge of the cover adjacent a sealing member forming a wall of a plenum (optionally an expandable plenum); and (ii) pressurizing the plenum to urge the sealing member against the edge of the cover.

J2. The method of paragraph J1, wherein the opening is a duct opening, wherein the cover includes a plurality of louvers, wherein closing a cover includes moving each of the louvers to a closed position such that an edge of one or more of the louvers is adjacent the sealing member, and wherein pressurizing the plenum urges the sealing member against the edge of the one or more louvers.

J3. The method of paragraph J2, further comprising operating a lift fan mounted in the duct prior to closing.

J4. The method of paragraph J3, further comprising applying suction to the plenum while operating the lift fan.

J5. The method of any of paragraphs J1 to J4, wherein the plenum contains a porous material, and wherein applying suction urges the sealing member against the porous material.

J6. The method of any of paragraphs J1 to J5, wherein pressurizing includes forming a seal between the cover and the sealing member, and wherein the seal extends more than halfway (such as substantially completely) around the opening of the duct or chamber.

J7. The method of any of paragraphs J1 to J6, further comprising any limitation(s) of any other paragraph(s) of this section.

Advantages, Features, and Benefits

The different examples of a fan apparatus, a louvered cover with varying chord lengths and/or projection distances, an actuation assembly for a louvered cover, a sealable cover for a duct/chamber, and corresponding aircraft and associated methods described herein, provide several advantages over known solutions. For example, illustrative examples described herein of louvered covers including louvers with different chord lengths and/or different projection distances in an intermediate position reduce the height of a boundary layer over an airfoil structure when transitioning between horizontal and vertical flight modes, for a smoother and more efficient transition. Illustrative examples described herein of louver actuation assemblies move louvers of a louvered cover with improved mechanical advantage and more optimal positioning, by rotation and translation of the louvers. Illustrative examples described herein of sealing assemblies provide sealing of covers, such as louvered covers of fan apparatuses, by fluid-driven actuation of a sealing member, which provides a lighter actuation mechanism with fewer moving parts and/or more reliable sealing.

Additionally, and among other benefits, illustrative examples described herein provide low-turbulence airflow to a lift fan of a fan apparatus.

Additionally, and among other benefits, illustrative examples described herein improve lift and reduce drag and vibration during transition between flight modes in a VTOL aircraft.

Additionally, and among other benefits, illustrative examples described herein house a linkage assembly for louver actuation inside a fixed beam of a fan apparatus, which protects the linkage assembly and makes the fan apparatus more aerodynamic.

No known system or apparatus can perform these functions, particularly under flight conditions. Thus, the illustrative examples described herein are particularly useful for airfoil-embedded lift fans of VTOL aircraft. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A fan apparatus, comprising:
a duct having an opening;
a lift fan mounted in the duct; and
a series of louvers positioned at the opening and each configured to move between an open position and a closed position, the louvers being offset from one another along a fore-to-aft axis; and
wherein each louver has a pivot axis, and each successive pivot axis is progressively closer to a trailing edge of the respective louver.

2. The fan apparatus of claim 1, where a chord length of the louvers increases successively from fore to aft along the series of louvers.

3. The fan apparatus of claim 2, wherein the chord length of the louvers increases linearly from fore to aft along the series of louvers.

4. The fan apparatus of claim 1, wherein a chord length of the louvers varies by at least 10% among the louvers.

5. The fan apparatus of claim 1, wherein a chord length of the louvers varies by at least 25% among the louvers.

6. The fan apparatus of claim 1, wherein the louvers are positioned at an inlet opening of the duct.

7. An aircraft, comprising:
the fan apparatus of claim 1; and
an airfoil structure containing the duct of the fan apparatus; and
wherein each louver of the series of louvers is configured to move between the open position and the closed position when the aircraft transitions between a horizontal flight mode and a vertical flight mode.

8. The fan apparatus of claim 1, where a chord length of the louvers increases exponentially from fore to aft along the series of louvers.

9. The fan apparatus of claim 1, wherein a chord length of the louvers increases monotonically from fore to aft along the series of louvers.

10. The fan apparatus of claim 9, wherein each louver is open to the same angle in the open position.

11. The fan apparatus of claim 1, wherein each louver of the series of louvers has the same chord length.

12. An aircraft, comprising:
an airfoil structure including a duct having an opening;
a lift fan mounted in the duct; and
a series of louvers positioned at the opening, each of the louvers being configured to move between an open position and a closed position via an intermediate position when the aircraft transitions between a horizontal flight mode and a vertical flight mode, the louvers being offset from one another along a fore-to-aft axis; and
wherein:
the louvers include a fore louver and an aft louver each having the same chord length, and
in the intermediate position, the aft louver projects farther out of the duct than the fore louver,
each louver has a pivot axis, and
each successive pivot axis is progressively closer to a trailing edge of the respective louver.

13. The aircraft of claim 12, wherein:
each louver of the series of louvers has the same chord length,
each louver in the intermediate position projects a projection distance out of the duct, and
the projection distance of the louvers increases progressively from fore to aft along the series of louvers.

14. The aircraft of claim 13, wherein the projection distance of the louvers in the intermediate position increases linearly from fore to aft along the series of louvers.

15. The aircraft of claim 12, wherein a projection distance of the louvers in the intermediate position varies by at least 10% among the louvers.

16. The aircraft of claim 12, wherein a projection distance of the louvers in the intermediate position varies by at least 25% among the louvers.

17. The aircraft of claim 12, wherein the louvers are positioned at an inlet opening of the duct.

18. A method of controlling airflow with respect to an airfoil structure containing a lift fan mounted in a duct, during a transition phase between horizontal and vertical flight modes of an aircraft, the method comprising:
moving each louver of a series of louvers located at an opening of the duct between an open position or a closed position and an intermediate position, the louvers being offset from one another along a fore-to-aft axis and each configured to move between the open position and the closed position; and
wherein each louver has a pivot axis, and each successive pivot axis is progressively closer to a trailing edge of the respective louver.

19. The method of claim 18, further comprising flying the aircraft forward prior to moving each louver.

20. The method of claim 18, further comprising flying the aircraft forward after moving each louver.

* * * * *